United States Patent
Ohtsu et al.

(10) Patent No.: US 9,969,834 B2
(45) Date of Patent: May 15, 2018

(54) WAX DISPERSANT FOR TONER AND TONER

(71) Applicant: CANON KABUSHIKI KAISHA, Tokyo (JP)

(72) Inventors: Takeshi Ohtsu, Toride (JP); Kentaro Kamae, Kashiwa (JP); Ryuichiro Matsuo, Moriya (JP); Yosuke Iwasaki, Abiko (JP); Wakiko Katsumata, Kashiwa (JP); Masaharu Miura, Toride (JP); Koh Ishigami, Abiko (JP); Yuichi Mizo, Toride (JP); Kenta Mitsuiki, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/244,439

(22) Filed: Aug. 23, 2016

(65) Prior Publication Data

US 2017/0058067 A1 Mar. 2, 2017

(30) Foreign Application Priority Data

Aug. 25, 2015 (JP) .................. 2015-166044
Aug. 9, 2016 (JP) .................. 2016-156374

(51) Int. Cl.
G03G 9/087 (2006.01)
C08F 255/02 (2006.01)
G03G 9/08 (2006.01)

(52) U.S. Cl.
CPC ........... *C08F 255/02* (2013.01); *G03G 9/081* (2013.01); *G03G 9/0806* (2013.01); *G03G 9/0821* (2013.01); *G03G 9/08755* (2013.01); *G03G 9/08782* (2013.01); *G03G 9/08786* (2013.01)

(58) Field of Classification Search
CPC .................. G03G 9/08782; G03G 9/08786
See application file for complete search history.

(56) References Cited

U.S. PATENT DOCUMENTS

| | | | |
|---|---|---|---|
| 5,389,487 A * | 2/1995 | Kawakami | G03G 9/08711 430/109.3 |
| 7,279,262 B2 | 10/2007 | Fujikawa et al. | |
| 7,288,348 B2 | 10/2007 | Hayami et al. | |
| 7,396,626 B2 | 7/2008 | Fujikawa et al. | |
| 7,396,629 B2 | 7/2008 | Baba et al. | |
| 7,611,813 B2 | 11/2009 | Ida et al. | |
| 7,629,100 B2 | 12/2009 | Okamoto et al. | |
| 7,767,370 B2 | 8/2010 | Ishigami et al. | |
| 7,858,283 B2 | 12/2010 | Ishigami et al. | |
| 7,927,775 B2 | 4/2011 | Komatsu et al. | |
| 7,939,233 B2 | 5/2011 | Inoue et al. | |
| 8,084,174 B2 | 12/2011 | Hasegawa et al. | |
| 8,137,886 B2 | 3/2012 | Baba et al. | |
| 8,288,069 B2 | 10/2012 | Fujikawa et al. | |
| 8,298,742 B2 | 10/2012 | Okamoto et al. | |
| 8,323,726 B2 | 12/2012 | Naka et al. | |
| 8,921,023 B2 | 12/2014 | Baba et al. | |
| 8,927,188 B2 | 1/2015 | Naka et al. | |
| 8,945,805 B2 | 2/2015 | Baba et al. | |
| 8,974,994 B2 | 3/2015 | Kamae et al. | |
| 8,986,914 B2 | 3/2015 | Fujikawa et al. | |
| 9,034,551 B2 | 5/2015 | Endo et al. | |
| 9,046,800 B2 | 6/2015 | Hotta et al. | |
| 9,058,924 B2 | 6/2015 | Komatsu et al. | |
| 9,063,443 B2 | 6/2015 | Ishigami et al. | |
| 9,075,328 B2 | 7/2015 | Minagawa et al. | |
| 9,152,088 B1 | 10/2015 | Kobori et al. | |
| 9,372,420 B2 | 6/2016 | Mizo et al. | |
| 9,417,540 B2 | 8/2016 | Hashimoto et al. | |
| 9,436,112 B2 | 9/2016 | Iwasaki et al. | |
| 2008/0311502 A1 * | 12/2008 | Ota | G03G 9/0819 430/108.4 |
| 2010/0028796 A1 | 2/2010 | Nakamura et al. | |
| 2010/0183971 A1 | 7/2010 | Fujikawa et al. | |
| 2012/0214097 A1 | 8/2012 | Naka et al. | |
| 2013/0244159 A1 | 9/2013 | Ishigami et al. | |
| 2013/0288173 A1 | 10/2013 | Hashimoto et al. | |
| 2013/0309603 A1 | 11/2013 | Takahashi et al. | |
| 2014/0096409 A1 | 4/2014 | Ohtsu et al. | |

(Continued)

FOREIGN PATENT DOCUMENTS

| | | |
|---|---|---|
| EP | 0 519 715 | 12/1992 |
| EP | 0 578 043 | 1/1994 |
| EP | 0 679 684 | 11/1995 |
| EP | 1 719 786 | 11/2006 |
| EP | 2 282 235 | 2/2011 |
| JP | 2007-264349 | 10/2007 |
| JP | 2011-013548 | 1/2011 |
| JP | 2011-123352 | 6/2011 |
| JP | 2013-015830 | 1/2013 |

OTHER PUBLICATIONS

Fedors, "A Method for Estimating Both the Solubility Parameters and Molar Volumes of Liquids", Polymer Engineering and Science, vol. 14, No. 2 (1974) 147-54.

(Continued)

*Primary Examiner* — Hoa V Le

(74) *Attorney, Agent, or Firm* — Fitzpatrick Cella Harper and Scinto

(57) ABSTRACT

A wax dispersant for a toner including a polymer obtained by graft polymerization of a styrene-acrylic resin onto a hydrocarbon compound, wherein the styrene-acrylic resin has a structural segment derived from a saturated alicyclic compound, and a toner including a toner particle that contains a binder resin, a wax, and a polymer obtained by graft polymerization of a styrene-acrylic resin onto a hydrocarbon compound, wherein the styrene-acrylic resin has a structural segment derived from a saturated alicyclic compound.

15 Claims, 1 Drawing Sheet

(56) References Cited

U.S. PATENT DOCUMENTS

| | | |
|---|---|---|
| 2014/0101966 A1 | 4/2014 | Minagawa et al. |
| 2014/0113228 A1 | 4/2014 | Shiotari et al. |
| 2014/0134535 A1 | 5/2014 | Baba et al. |
| 2014/0137428 A1 | 5/2014 | Takenaka et al. |
| 2014/0140731 A1* | 5/2014 | Hozumi ............... G03G 9/0804 399/252 |
| 2014/0329176 A1 | 11/2014 | Kanno et al. |
| 2015/0177634 A1 | 6/2015 | Kamae et al. |
| 2016/0091811 A1* | 3/2016 | Doi ................... G03G 9/08755 430/105 |
| 2016/0109820 A1 | 4/2016 | Hashimoto et al. |
| 2016/0334725 A1 | 11/2016 | Katsumata et al. |

OTHER PUBLICATIONS

Imoto, "Fundamental Theory of Adhesion" Published by "Kobunshi Kankokai", Chapter V (1993).

* cited by examiner

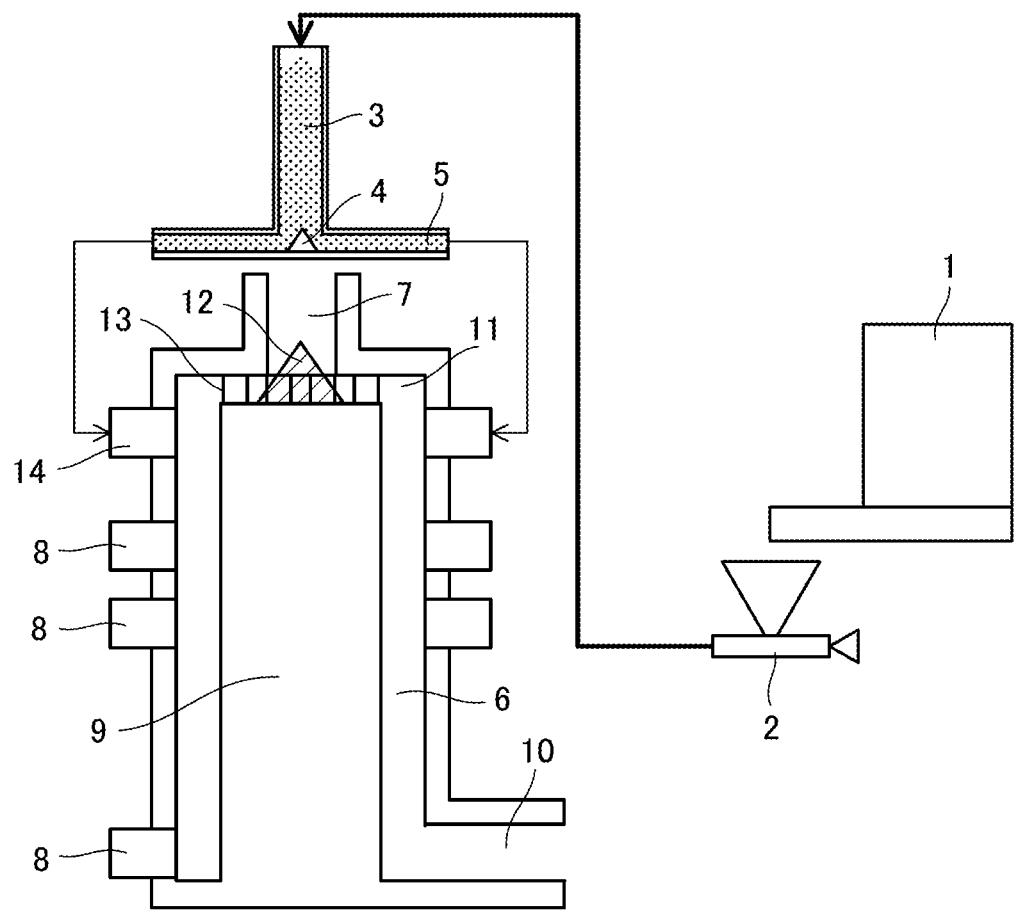

WAX DISPERSANT FOR TONER AND TONER

BACKGROUND OF THE INVENTION

Field of the Invention

The present invention relates to a wax dispersant for a toner and a toner including the wax dispersant for a toner.

Description of the Related Art

In recent years, electrophotographic full-color copiers have become widely used and also started to be applied in the printing market. The printing market requires high speed, high image quality, and high productivity as well as adaptability to a wide range of media (paper-types).

One concrete example of such requirements is "media isokinetic ability" in which, even when a paper type is changed from thick to thin, it is possible to perform continuous printing without changing the process speed for matching the paper type or changing the set heating temperature of a fixing device.

From the standpoint of this media isokinetic ability, a toner is required to ensure that fixing could be appropriately completed within a wide range of fixing temperature from a low temperature to a high temperature.

A method for imparting releasability to a toner by including a wax in the toner is used to fix a toner appropriately within a wide range of fixing temperature. In this case, it is desirable that the wax in the toner be in a fine and uniformly dispersed state because the quality of the dispersed state has a significant impact on toner properties.

Japanese Patent Application Laid-open No. 2011-13548 suggests a technique of including a wax dispersant in a toner in order to control the dispersed state of the wax in the toner.

Further, Japanese Patent Application Laid-open No. 2007-264349 suggests using a toner binder configured of a high-viscosity resin, a low-viscosity resin, and a dispersant so as to increase the dispersivity of a wax and thereby suppress image degradation.

However, even in the case where the dispersed state of a wax in a toner is controlled, if the toner is left to stand at a high temperature and high humidity, charging performance of the toner may be degraded because the wax elutes to the toner surface and toner flowability may therefore be worsened.

Further, Japanese Patent Application Laid-open No. 2011-123352 suggests a variety of toners, in which low-temperature fixing performance is improved by adding to the toner a crystalline resin having sharp melt property, thereby enabling fixing in a wide temperature range.

However, in high-speed machines adapted to the printing market, there are cases where fixability at a low temperature is still insufficient and leaving the toner at a high temperature may lead to blocking. Further, since the toner shape is not controlled, transfer efficiency can be insufficient.

In this respect, Japanese Patent Application Laid-open No. 2013-15830 suggests controlling the toner shape by heat treatment and lowering the adhesion force of the toner in order to increase the transfer efficiency.

Here, although the heat treatment controls the toner shape, this process is known to cause waxes having high adhesivity to elute to the vicinity of the toner surface. As a result, the flowability of the toner is degraded under the effect of the wax having eluted to the vicinity of the toner surface, and charging performance of the toner may deteriorate.

It follows from the above that there is still room for investigation aimed at controlling the dispersed state of a wax in a toner while ensuring charging performance, low-temperature fixability, and blocking resistance of the toner.

SUMMARY OF THE INVENTION

The present invention provides a wax dispersant for a toner that resolves the abovementioned problems. More specifically, the present invention provides a wax dispersant for a toner that can control the dispersed state of the wax included in a toner particle and also control the elution of the wax to the toner particle surface.

The present invention also provides a toner that resolves the abovementioned problems and can exhibit sufficient charging performance even under severe circumstances relating thereto, while ensuring low-temperature fixability and blocking resistance.

Thus, the present invention relates to a wax dispersant for a toner comprising a polymer obtained by graft polymerization of a styrene-acrylic resin onto a hydrocarbon compound, wherein the styrene-acrylic resin has a structural segment derived from a saturated alicyclic compound.

The present invention also relates to a toner comprising a toner particle that contains a binder resin, a wax, and a polymer obtained by graft polymerization of a styrene-acrylic resin onto a hydrocarbon compound, wherein the styrene-acrylic resin has a structural segment derived from a saturated alicyclic compound.

With the present invention, it is possible to provide a wax dispersant for a toner that can control the dispersed state of the wax included in a toner particle and to control the elution of the wax to the toner particle surface.

With the present invention, it is also possible to provide a toner that can exhibit sufficient charging performance even under severe circumstances relating thereto, while ensuring low-temperature fixability and blocking resistance.

Further features of the present invention will become apparent from the following description of exemplary embodiments (with reference to the attached drawings).

BRIEF DESCRIPTION OF THE DRAWINGS

FIG. 1 is a cross-sectional view of a heat treatment device.

DESCRIPTION OF THE EMBODIMENTS

The wax dispersant for a toner in accordance with the present invention (can be also referred to hereinbelow simply as "wax dispersant") includes a polymer obtained by graft polymerization of a styrene-acrylic resin onto a hydrocarbon compound, wherein the styrene-acrylic resin has a structural segment derived from a saturated alicyclic compound.

In the wax dispersant of the present invention, the styrene-acrylic resin has affinity for the resin constituting the toner particle, and the hydrocarbon compound segment has affinity for the wax included in the toner particle. For this reason, the wax can be finely dispersed in the toner particle.

Further, when the styrene-acrylic resin has a structural segment derived from a saturated alicyclic compound, the wax can be finely dispersed in the toner particle and, at the same time, the charging performance of the toner can be maintained, even when the toner is left to stand at a high temperature and high humidity.

The results of the investigation conducted by the inventors suggest the following mechanism.

Where a toner is left to stand at a high temperature and high humidity, a wax usually migrates to the toner particle surface.

Meanwhile, where the toner particle includes the wax dispersant of the present invention, when the wax migrates to the toner particle surface, the wax dispersant apparently also migrates together with the wax to the toner particle surface.

When compared with the conventional wax dispersants, the wax dispersant of the present invention has a structural segment derived from a bulky saturated alicyclic compound. Therefore, even though the wax dispersant migrates to the toner particle surface, the elution of the wax is suppressed. As a result, the toner is not decreased in flowability even when the toner is left to stand at a high temperature and high humidity so that the toner has improved blocking resistance, and the charging performance thereof is considered not to be degraded.

Further, when the wax dispersant migrates to the toner particle surface, since the structural segment derived from a saturated alicyclic compound exhibits hydrophobicity, the hydrophobicity of the toner particle is increased, and charging performance is considered not to deteriorate even when the toner is left to stand at a high temperature and high humidity.

The wax dispersant for a toner in accordance with the present invention includes a polymer obtained by graft polymerization of a styrene-acrylic resin onto a hydrocarbon compound, wherein the styrene-acrylic resin has a structural segment derived from a saturated alicyclic compound.

The hydrocarbon compound is not particularly limited, but from the standpoint of affinity for the wax inside the toner particle, it may be selected from the below-described waxes to be used in the toner of the present invention.

In the hydrocarbon compound, the peak temperature of the maximum endothermic peak measured using differential scanning calorimetry (DSC) is preferably at least 60° C. and not more than 110° C. It is also preferred that the hydrocarbon compound have a weight-average molecular weight (Mw) from at least 900 and not more than 50,000.

In the present invention, the hydrocarbon compound can be suitably exemplified by hydrocarbon waxes such as polyethylene of a low molecular weight, polypropylene of a low molecular weight, alkylene copolymers, microcrystalline waxes, paraffin waxes, and Fischer-Tropsch waxes.

From the standpoint of reactivity at the time of producing the wax dispersant, it is preferred that the hydrocarbon compound have a branched structure such as that of polypropylene.

The content ratio of the hydrocarbon compound in the polymer obtained by graft polymerization of the styrene-acrylic resin onto the hydrocarbon compound is preferably at least 5.0 mass % and not more than 20.0 mass %, and more preferably at least 8.0 mass % and not more than 12.0 mass %.

Further, in the present invention, a method for graft polymerizing the styrene-acrylic resin onto the hydrocarbon compound is not particularly limited, and the conventional well-known methods can be used.

In the wax dispersant of the present invention, the styrene-acrylic resin is not particularly limited, provided that the resin has a structural segment derived from a saturated alicyclic compound.

For example, the styrene-acrylic resin may be in the form having a monomer unit represented by Formula (1) below.

The monomer unit, as referred to herein, is a form obtained by a reaction of a monomer in a polymer.

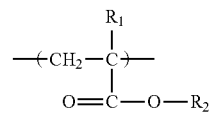

Formula (1)

(in Formula (1), $R_1$ represents a hydrogen atom or a methyl group, and $R_2$ represents a saturated alicyclic group)

The saturated alicyclic group in $R_2$ is preferably a saturated alicyclic hydrocarbon group, more preferably a saturated alicyclic hydrocarbon group with a carbon number from at least 3 and not more than 18 and more preferably a saturated alicyclic hydrocarbon group with a carbon number from at least 4 and not more than 12. The saturated alicyclic hydrocarbon group is inclusive of a cycloalkyl group, a condensed polycyclic hydrocarbon group, a bridged cyclic hydrocarbon group, and a spiro hydrocarbon group.

Examples of such saturated alicyclic group include a cyclopropyl group, a cyclobutyl group, a cyclopentyl group, a cyclohexyl group, a t-butyl cyclohexyl group, a cycloheptyl group, a cyclooctyl group, a tricyclodecanyl group, a decahydro-2-naphthyl group, a tricyclo [5.2.1.02,6]decan-8-yl group, a pentacyclopentadecanyl group, an isobornyl group, an adamantyl group, a dicyclopentanyl group, and a tricyclopentanyl group.

The saturated alicyclic group may have an alkyl group, a halogen atom, a carboxy group, a carbonyl group, and a hydroxy group as a substituent. The alkyl group is preferably an alkyl group with a carbon number of 1 to 4.

Among these saturated alicyclic groups, a cycloalkyl group, a condensed polycyclic hydrocarbon group, and a bridged cyclic hydrocarbon group is preferred, a cycloalkyl group with a carbon number of at least 3 and not more than 18, a substituted or unsubstituted dicyclopentanyl group, and a substituted or unsubstituted tricyclopentanyl group are more preferred, a cycloalkyl group with a carbon number of at least 4 and not more than 12 is even more preferred, and a cycloalkyl group with a carbon number of at least 6 and not more than 10 is particularly preferred.

The position and number of substituents are not restricted, and where two or more substituents are present, the substituents may be the same or different.

In the present, invention, the content ratio of the monomer unit represented by Formula (1) is preferably at least 1.5 mol % and not more than 45.0 mol %, more preferably at least 3.0 mol % and not more than 25.0 mol %, based on the total of monomer units constituting the styrene-acrylic resin.

The styrene-acrylic resin may contain a homopolymer of a vinyl monomer (a) having a structural segment derived from a saturated alicyclic compound, but may contain also a copolymer with another monomer (b).

Examples of the vinyl monomer (a) include monomers such as cyclopropyl acrylate, cyclobutyl acrylate, cyclopentyl acrylate, cyclohexyl acrylate, cycloheptyl acrylate, cyclooctyl acrylate, cyclopropyl methacrylate, cyclobutyl methacrylate, cyclopentyl methacrylate, cyclohexyl methacrylate, cycloheptyl methacrylate, cyclooctyl methacrylate, dihydrocyclopentadiethyl acrylate, dicyclopentanyl acrylate, and dicyclopentanyl methacrylate, and combinations thereof.

Among these, from the standpoint of hydrophobicity, cyclohexyl acrylate, cycloheptyl acrylate, cyclooctyl acrylate, cyclohexyl methacrylate, cycloheptyl methacrylate, and cyclooctyl methacrylate are preferred.

Examples of the other monomer (b) include styrenic monomers such as styrene, α-methyl styrene, p-methyl styrene, m-methyl styrene, p-methoxystyrene, p-hydroxystyrene, p-acetoxystyrene, vinyl toluene, ethyl styrene, phenyl styrene, and benzyl styrene; alkyl esters (the carbon number of the alkyl is at least 1 and not more than 18) of unsaturated carboxylic acids, such as methyl acrylate, ethyl acrylate, butyl acrylate, 2-ethylhexyl acrylate, methyl methacrylate, ethyl methacrylate, butyl methacrylate, and 2-ethylhexyl methacrylate; vinyl ester monomers such as vinyl acetate; vinyl ether monomers such as vinyl methyl ether; halogen-containing vinyl monomers such as vinyl chloride; diene monomers such as butadiene and isobutylene, and combinations thereof.

A monomer adding an acid group or a hydroxyl group may be also contained as a component of the copolymer for polarity adjustment. Examples of the monomer adding an acid group or a hydroxyl group include acrylic acid, methacrylic acid, maleic anhydride, maleic acid half esters, and 2-ethylhexyl acrylate.

In the present invention, from the standpoint of low-temperature fixability of the toner, it is preferred that the styrene-acrylic resin have a monomer unit represented by Formula (2) below.

Where the styrene-acrylic resin has a monomer unit represented by Formula (2), the glass transition temperature (Tg) of the wax dispersant tends to decrease. As a result, when the wax dispersant is contained in a toner particle, the charging performance of the toner does not decrease even when the toner is left to stand at a high temperature and high humidity, and the low-temperature fixability is further improved.

In the present invention, the content ratio of the monomer unit represented by Formula (2) is preferably at least 5.0 mol % and not more than 30.0 mol %, more preferably at least 10.0 mol % and not more than 20.0 mol %, based on the total of monomer units constituting the styrene-acrylic resin.

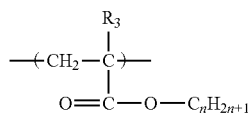

Formula (2)

(in Formula (2), $R_3$ represents a hydrogen atom or a methyl group, n represents an integer of at least 1 and not more than 18 (n is preferably an integer of at least 3 and not more than 12))

The acid value of the wax dispersant is preferably at least 5 mg KOH/g and not more than 50 mg KOH/g and more preferably at least 15 mg KOH/g and not more than 35 mg KOH/g.

Where the acid value of the wax dispersant is within the above ranges, the affinity of the wax dispersant and the resin in the toner is further improved and wax dispersibility in the toner is further improved. Further, the hydrophobicity of the toner particle becomes appropriate and charging performance at a high temperature and high humidity is improved.

In the present invention, in the molecular weight distribution of the wax dispersant measured by gel permeation chromatography (GPC), the weight-average molecular weight (Mw) is preferably at least 5000 and not more than 70,000 and more preferably at least 10,000 and not more than 50,000.

Where the weight-average molecular weight (Mw) of the wax dispersant is in the above ranges, the dispersibility of the wax in the toner particle is improved. At the same time, blocking resistance and hot offset resistance are also improved.

When the weight-average molecular weight (Mw) of the wax dispersant is less than 5000, the wax dispersant can easily move in the toner particle. As a result, the elution of the wax to the toner particle surface tends to increase when the toner is left to stand at a high temperature and high humidity, and the charging performance and blocking resistance of the toner tend to decrease.

Meanwhile, when the weight-average molecular weight (Mw) of the wax dispersant is greater than 70,000, the wax finely dispersed in the toner particle is unlikely to migrate rapidly to the toner particle surface at the time of fixing and melting. Therefore, the releasability at the time of fixing tends to decrease and the occurrence of high-temperature offset tends to be more probable.

The toner of the present invention has a toner particle including a binder resin, a wax, and the wax dispersant for a toner.

Further, the binder resin preferably includes an amorphous polyester resin.

It is more preferred that the binder resin include a crystalline polyester resin and an amorphous polyester resin.

When a polyester resin is used as the binder resin, compatibility between the polyester resin and the wax is low. Therefore, when the wax is added and included, as is, in the toner particle, the wax is present in a unevenly distributed state in the toner particle, and a free wax is also generated. As a result, undesirable problems such as poor charging can occur.

Meanwhile, where the toner of the present invention includes the above-described wax dispersant for a toner and also where the binder resin includes a crystalline polyester resin, the dispersion state of the wax and crystalline polyester resin in the toner particle is controlled. As a result, sufficient charging performance can be demonstrated even under severe circumstances relating thereto, while ensuring low-temperature fixability, hot offset resistance, and blocking resistance.

The amount of the crystalline polyester resin in the toner particle is preferably at least 1.0 part by mass and not more than 15.0 parts by mass, and more preferably at least 2.0 parts by mass and not more than 10.0 parts by mass, per 100.0 parts by mass of the amorphous polyester resin.

Where the amount of the crystalline polyester is within the aforementioned ranges, the low-temperature fixability is improved.

Where the amount of the crystalline polyester resin is greater than 15.0 parts by mass, a fine dispersion of the crystalline polyester resin in the toner particle tends to be difficult to obtain and the low-temperature fixability tends to decrease.

The amount of the wax dispersant for a toner in the toner particle is preferably at least 2.0 parts by mass and not more than 15.0 parts by mass, and more preferably at least 4.0 parts by mass and not more than 7.5 parts by mass, per 100.0 parts by mass of the amorphous polyester resin.

In the present invention, the binder resin preferably includes a crystalline polyester resin.

In the present invention, the crystalline resin is a resin in which an endothermic peak is observed in differential scanning calorimetry (DSC).

The crystalline polyester resin can be obtained by a reaction of a divalent or higher polyvalent carboxylic acid with a diol. Among such methods, it is preferred that the resin be obtained by polycondensation of an aliphatic diol and an aliphatic dicarboxylic acid, because the degree of crystallinity is high. Further, in the present invention, the crystalline polyester resins may be used individually or in combinations of a plurality thereof.

In the present invention, the crystalline polyester resin is preferably obtained by polycondensation of an alcohol component including at least one compound selected from the group consisting of aliphatic diols with a carbon number of at least 2 and not more than 22 and derivatives thereof, and a carboxylic acid component including at least one compound selected from the group consisting of aliphatic dicarboxylic acids with a carbon number of at least 2 and not more than 22 and derivatives thereof.

Among them, from the standpoint of low-temperature fixability and blocking resistance, it is preferred that the crystalline polyester resin be obtained by polycondensation of an alcohol component including at least one compound selected from the group consisting of aliphatic diols with a carbon number of at least 6 and not more than 12 and derivatives thereof, and a carboxylic acid component including at least one compound selected from the group consisting of aliphatic dicarboxylic acids with a carbon number of at least 6 and not more than 12 and derivatives thereof.

Aliphatic diols with a carbon number of at least 2 and not more than 22 (preferably, at least 6 and not more than 12) are not particularly limited, and may be chain (preferably, linear) aliphatic diols.

Examples of such diols include ethylene glycol, diethylene glycol, triethylene glycol, 1,2-propylene glycol, dipropylene glycol, 1,3-propanediol, 1,4-butanediol, 1,4-butadiene glycol, 1,5-pentanediol, neopentyl glycol, 1,6-hexanediol, 1,7-heptanediol, 1,8-octanediol, 1,9-nonanediol, 1,10-decanediol, 1,11-undecanediol, and 1,12-dodecanediol.

Among these, linear aliphatic α,ω-diols such as 1,6-hexanediol, 1,7-heptanediol, 1,8-octanediol, 1,9-nonanediol, 1,10-decanediol, 1,11-undecanediol, and 1,12-dodecanediol are preferred.

In the present invention, the derivatives are not particularly limited, provided that the same resin structure is obtained by polycondensation. Examples include derivatives obtained by esterification of the diols.

In the present invention, the at least one compound selected from the group consisting of aliphatic diols with a carbon number of at least 2 and not more than 22 (preferably, a carbon number of at least 6 and not more than 12) and derivatives thereof in the alcohol component constituting the crystalline polyester resin is contained preferably at at least 50 mass %, more preferably at at least 70 mass % with respect to the entire alcohol component.

In the present invention, a polyhydric alcohol other than the aliphatic diol can be also used.

Among the polyhydric alcohols, examples of diols other than the aliphatic diols include aromatic alcohols such as polyoxyethylenated bisphenol A and polyoxypropylenated bisphenol A, and also 1,4-cyclohexanedimethanol.

Among the polyhydric alcohols, examples of trihydric and higher polyhydric alcohols include aromatic alcohols such as 1,3,5-trihydroxymethylbenzene, and aliphatic alcohols such as pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, and trimethylolpropane.

Further, in the present invention, a monohydric alcohol may be also used to an extent such that properties of the crystalline polyester resin are not impaired. Examples of the monohydric alcohol include n-butanol, isobutanol, sec-butanol, n-hexanol, n-octanol, 2-ethylhexanol, cyclohexanol, and benzyl alcohol.

Meanwhile, the aliphatic dicarboxylic acids with a carbon number of at least 2 and not more than 22 (preferably, a carbon number of at least 6 and not more than 12) are not particularly limited, and chain (preferably, linear) aliphatic dicarboxylic acids may be used.

Examples of such acids include oxalic acid, malonic acid, succinic acid, glutaric acid, adipic acid, pimelic acid, suberic acid, glutaconic acid, azelaic acid, sebacic acid, nonanedicarboxylic acid, decanedicarboxylic acid, undecanedicarboxylic acid, dodecanedicarboxylic acid, maleic acid, fumaric acid, mesaconic acid, citraconic acid, and itaconic acid.

Hydrolyzed lower alkyl esters or anhydrides of these acids can be also used.

In the present invention, the derivatives are not particularly limited, provided that the same resin structure is obtained by polycondensation. Thus, suitable examples include acid anhydrides of the dicarboxylic acid components and derivatives obtained by methyl esterification, ethyl esterification, or acid chloridation of the dicarboxylic acid components.

In the present invention, the at least one compound selected from the group consisting of aliphatic dicarboxylic acids with a carbon number of at least 2 and not more than 22 (preferably, a carbon number of at least 6 and not more than 12) and derivatives thereof in the carboxylic acid component constituting the crystalline polyester resin is contained preferably at at least 50 mass %, more preferably at at least 70 mass % with respect to the entire carboxylic acid component.

In the present invention, a polyvalent carboxylic acid other than the abovementioned aliphatic dicarboxylic acids can be also used. Among the polyhydric carboxylic acids, examples of the divalent carboxylic acids other than the aliphatic dicarboxylic acids include aromatic carboxylic acids such as isophthalic acid and terephthalic acid; aliphatic carboxylic acids such as n-dodecylsuccinic acid and n-dodecenylsuccinic acid; and alicyclic carboxylic acids such as cyclohexanedicarboxylic acid. The list is also inclusive of acid anhydrides and lower alkyl esters thereof.

Further, among the other polyvalent carboxylic acids, examples of trivalent or higher polyvalent carboxylic acids include aromatic carboxylic acids such as 1,2,4-benzenetricarboxylic acid (trimellitic acid), 2,5,7-naphthalenetricarboxylic acid, 1,2,4-naphthalenetricarboxylic acid, and pyromellitic acid; and aliphatic carboxylic acids such as 1,2,4-butanetricarboxylic acid, 1,2,5-hexanetricarboxylic acid, and 1,3-di-carboxyl-2-methyl-2-methylenecarboxypropane. The list is also inclusive of derivatives of acid anhydrides and lower alkyl esters of the above.

Further, in the present invention, a monovalent carboxylic acid may be also used to an extent such that properties of the crystalline polyester resin are not impaired. Examples of the monovalent carboxylic acid include benzoic acid, naphthalenecarboxylic acid, salicylic acid, 4-methylbenzoic acid, 3-methylbenzoic acid, phenoxyacetic acid, biphenylcarboxylic acid, acetic acid, propionic acid, butyric acid, and octanoic acid.

In the present invention, the crystalline polyester resin can be produced according to the usual polyester synthesis method. For example, the crystalline polyester resin can be obtained by performing esterification or transesterification of the carboxylic acid component and alcohol component, and then inducing a polycondensation reaction by the usual method under reduced pressure or upon introducing nitrogen gas.

The esterification or transesterification can be performed by using, as necessary, the usual esterification catalyst or transesterification catalyst such as sulfuric acid, titanium butoxide, tin 2-ethylhexanoate, dibutyltin oxide, manganese acetate, and magnesium acetate.

The polycondensation can be performed by using the usual polymerization catalyst, for example, a well-known catalyst such as titanium butoxide, tin 2-ethylhexanoate, dibutyltin oxide, tin acetate, zinc acetate, tin disulfide, antimony trioxide, and germanium dioxide. The polymerization temperature and amount of the catalyst are not particularly limited and may be determined as appropriate.

In order to increase the strength of the crystalline polyester resin obtained, in the esterification or transesterification reaction, or in the polycondensation reaction, all of the monomers may be charged as a single lot, or divalent monomers may be initially reacted to reduce the components of a low molecular weight and then the reaction may be conducted by adding trivalent or higher monomers.

The reason why the low-temperature fixability of the toner is improved by using the crystalline polyester resin in the present invention is discussed hereinbelow.

Thus, this is because the glass transition temperature (Tg) of the toner is greatly reduced and a state with a low melt viscosity is obtained since the crystalline polyester resin and the amorphous polyester resin are compatible, the spacing of the molecular chain of the amorphous polyester resin is enlarged, and intermolecular forces are weakened.

In order to enhance the compatibility of the crystalline polyester resin and amorphous polyester resin, it is possible to decrease the carbon number of the aliphatic diol and/or aliphatic dicarboxylic acid constituting the crystalline polyester resin, increase the concentration of ester groups, and increase polarity.

However, even in the toner having a significantly reduced glass transition temperature (Tg), it is necessary to ensure the blocking resistance in use, transportation, etc. in a high-temperature and high-humidity environment. For this purpose, when the toner is exposed to a high temperature and high humidity, it is necessary to recrystallize the compatibilized crystalline polyester resin in the toner and return the glass transition temperature (Tg) of the toner close to the glass transition temperature (Tg) of the amorphous polyester resin.

In this case, where the concentration of ester groups in the crystalline polyester resin is high and the compatibility of the crystalline polyester resin and amorphous polyester resin is too high, it becomes difficult to recrystallize the crystalline polyester resin, and the blocking resistance of the toner tends to decrease.

It follows from the above that from the standpoint of low-temperature fixability and blocking resistance, it is preferred that the carbon number of the aliphatic diol constituting the crystalline polyester resin be at least 6 and not more than 12 and the carbon number of the aliphatic dicarboxylic acid constituting the crystalline polyester resin be at least 6 and not more than 12.

Further, in the present invention, the low-temperature fixability is further increased as a result of using the wax dispersant together with the crystalline polyester resin.

Generally, as indicated hereinabove, a plasticizer such as a crystalline polyester resin enters the gaps in an amorphous polyester resin, thereby preventing the amorphous polyester resin from being oriented regularly and thus exhibits a plasticizing effect. Therefore, plasticizers having bulky side chains often demonstrate useful properties.

Since the wax dispersant of the present invention has a structural segment derived from a bulky saturated alicyclic compound, it can be assumed that the wax dispersant becomes a plasticizer having bulky side chains as a result of interaction between the wax dispersant and the crystalline polyester resin in the toner. This is apparently why in the present invention the low-temperature fixability is further improved as a result of using the wax dispersant together with the crystalline polyester resin.

In the present invention, the solubility parameter SP1 of the crystalline polyester resin and the solubility parameter SP2 of the wax dispersant for a toner preferably satisfy the relationship of $0 \leq SP1-SP2 \leq 1.3$.

Where the two solubility parameters satisfy the relationship above, the affinity of the wax dispersant and the crystalline polyester resin is improved and the dispersibility of the wax and the crystalline polyester resin is also improved. The improved wax dispersibility results in increased hot offset resistance, and the improved dispersibility of the crystalline polyester resin results in improved low-temperature fixability.

Where the value of SP1-SP2 is less than zero, the solubility parameter of the wax dispersant becomes too large and the wax dispersibility tends to decrease. Meanwhile, where the value of SP1-SP2 exceeds 1.3, the difference in solubility parameters increases and the affinity of the crystalline polyester resin and the wax dispersant tends to decrease.

The solubility parameter [unit: $(cal/cm^3)^{1/2}$] is calculated by using the Fedors method. The evaporation energy ($\Delta ei$ [cal/mole]) and molar volume ($\Delta vi$ [$cm^3$/mole]) which are to be used in the calculation are numerical values presented in Minoru IMOTO "Fundamental Theory of Adhesion" Published by "Kobunshi Kankokai", Chapter V, and R. F. Fedors, Polym. Eng. Sci. 14, 147 (1974). Further, in the present invention, the calculations are performed on the basis on the structure of polymer structural units.

In the present invention, the binder resin preferably includes an amorphous polyester resin.

The content ratio of the amorphous polyester resin in the binder resin is preferably at least 50 mass %, more preferably at least 70 mass %, and even more preferably at least 90 mass %.

Similarly to the crystalline polyester resin, the amorphous polyester resin can be produced according to the usual polyester synthesis method.

Examples of monomers suitable for the production of the amorphous polyester resin include polyhydric alcohols (dihydric, trihydric, or higher polyhydric alcohols), and also polycarboxylic acids (divalent, trivalent, or higher polyvalent carboxylic acids) and acid anhydrides thereof or lower alkyl esters thereof.

Partial crosslinking in a molecule of the amorphous polyester resin is effective to produce a branched polymer, and a trivalent or higher polyvalent polyfunctional compound may be used therefor. Thus, a trivalent or higher polyvalent carboxylic acid and acid anhydrides thereof or lower alkyl esters thereof, and/or trihydric and higher polyhydric alcohols may be included as a monomer.

Examples of the polyhydric alcohols and polycarboxylic acids suitable for the production of the amorphous polyester resin are presented below.

Examples of dihydric alcohols include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3- hexanediol, hydrogenated bisphenol A, bisphenols represented by the Formula (A) below and derivatives thereof, and diols represented by the Formula (B) below.

(A)

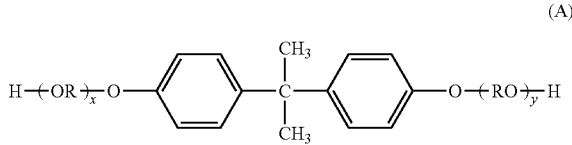

(in the formula, R is an ethylene group or a propylene group; x and y are integers of at least 0, the average value of x+y is at least 0 and not more than 10)

(B)

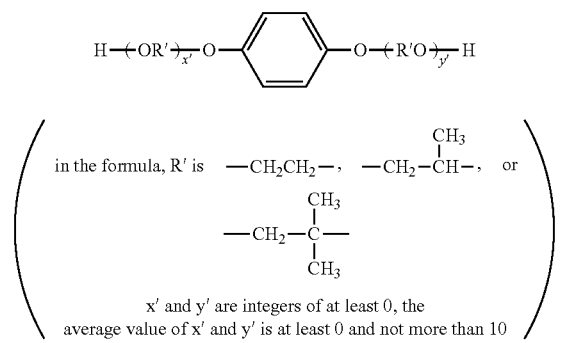

Examples of the divalent carboxylic acids include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecylsuccinic acid, isododecylsuccinic acid, n-octenylsuccinic acid, n-octylsuccinic acid, isooctenylsuccinic acid, and isooctylsuccinic acid. Acid anhydrides and lower alkyl esters thereof may be also used.

Among these, maleic acid, fumaric acid, terephthalic acid, adipic acid, and n-dodecenylsuccinic acid are preferably used.

Examples of trihydric and higher polyhydric alcohols include sorbitol, 1,2,3,6-hexanetetraol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymehylbeiizene.

Among these, glycerol, trimethylolpropane, and pentaerythritol are advantageous examples.

Examples of trivalent or higher polyvalent carboxylic acids include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-di-carboxyl-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, and an Empol trimer acid. Acid anhydrides and lower alkyl ester thereof may be also used.

Among these, 1,2,4-benzenetricarboxylic acid (trimellitic acid) or derivatives thereof are preferably used because of a low cost and easy reaction control.

The abovementioned dihydric alcohols and trihydric or higher polyhydric alcohols may be used individually or in combinations of a plurality thereof. Likewise, the abovementioned divalent carboxylic acids and trivalent or higher polyvalent carboxylic acids may be used individually or in combinations of a plurality thereof.

In the present invention, the amorphous polyester resin may be a hybrid resin. For example, a hybrid resin can be obtained by chemically binding the amorphous polyester resin and a vinyl resin or a vinyl copolymer.

In this case, the content ratio of the amorphous polyester resin in the hybrid resin is preferably at least 50 mass % and more preferably at least 70 mass %.

A hybrid resin of an amorphous polyester resin and a vinyl resin or a vinyl copolymer can be produced, for example, by a method of ensuring the presence of polymers including monomer components capable of reacting with either of the vinyl resin or vinyl copolymer and the polyester resin, and performing the polymerization reaction of either one or both resins.

Among the monomers constituting amorphous polyester resins, examples of those capable of reacting with the vinyl resin or vinyl copolymer include unsaturated dicarboxylic acids such as phthalic acid, maleic acid, citraconic acid, and, itaconic acid, and anhydrides thereof.

Among the monomers constituting the vinyl resins or vinyl copolymers, examples of those capable of reacting with the amorphous polyester resin include monomers having a carboxy group or a hydroxy group, acrylic acid esters, and methacrylic acid esters.

Further, in the present invention, a resin other than the amorphous polyester resin can be used as the binder resin to an extent such that the effects of the present invention are not impaired.

This resin is not particularly limited, and examples of suitable resins include those that have been used as binder resins for toners. Specific examples include vinyl resins, phenolic resins, phenolic resins modified with natural resins, maleic resins modified with natural resins, acrylic resins, methacrylic resins, polyvinyl acetate resins, silicone resins, polyurethane resins, polyamide resins, furan resins, epoxy resins, xylene resins, polyvinyl butyrals, terpene resins, coumarone-indene resins, and petroleum resins.

In the present invention, in the molecular weight distribution measured by gel permeation chromatography (GPC) of tetrahydrofuran (THF) solubles of the amorphous polyester resin, the peak molecular weight is preferably at least 4000 and not more than 13,000. This range is preferred from the standpoint of low-temperature fixability and hot offset resistance.

Further, from the standpoint of charging performance in a high-temperature and high-humidity environment, it is preferred that the acid value of the amorphous polyester resin be at least 2 mg KOH/g and not more than 30 mg KOH/g.

From the standpoint of low-temperature fixability and blocking resistance, it is preferred that the hydroxyl value of the amorphous polyester resin be at least 2 mg KOH/g and not more than 20 mg KOH/g.

In the present invention, the amorphous polyester resin can be also in the form including an amorphous polyester resin C of a low molecular weight with a peak molecular weight of at least 4500 and not more than 7000 and an amorphous polyester resin B of a high molecular weight with a peak molecular weight of at least 8500 and not more than 9500.

In this case, from the standpoint of low-temperature fixability and hot offset resistance, it is preferred that the mixing ratio (B/C) of the amorphous polyester resin B of a high molecular weight and the amorphous polyester resin C of a low molecular weight be at least 10/90 and not more than 60/40, on the mass basis.

From the standpoint of hot offset resistance, it is preferred that the peak molecular weight of the amorphous polyester resin B of a high molecular weight be at least 8500 and not more than 9500. Further, from the standpoint of charging performance in a high-temperature and high-humidity environment, it is preferred that the acid value of the amorphous polyester resin B of a high molecular weight be at least 10 mg KOH/g and not more than 30 mg KOH/g.

From the standpoint of low-temperature fixability, it is preferred that the peak molecular weight of the amorphous polyester resin C of a low molecular weight be at least 4500 and not more than 7000. Further, from the standpoint of charging performance in a high-temperature and high-humidity environment, it is preferred that the acid value of the amorphous polyester resin C of a low molecular weight be not more than 10 mg KOH/g.

The acid value is the number of milligrams of potassium hydroxide required to neutralize the acid contained in 1 g of the sample. The acid value of the resin is measured according to JIS K0070-1992.

In the present invention, the toner particle includes a wax. Suitable examples of the wax are listed below.

Hydrocarbon waxes such as polyethylene of a low molecular weight, polypropylene of a low molecular weight, alkylene copolymers, microcrystalline wax, paraffin wax, and Fischer-Tropsch waxes; oxides of hydrocarbon waxes such as polyethylene oxide wax, or block copolymers thereof; waxes mainly composed of fatty acid esters such as carnauba wax; and partially or entirely deoxidized fatty acid esters such as deoxidized carnauba wax.

Other examples are listed below. Saturated linear fatty acids such as palmitic acid, stearic acid, and montanic acid; unsaturated fatty acids such as brassidic acid, eleostearic acid, and parinaric acid; saturated alcohols such as stearyl alcohol, aralkyl alcohol, behenyl alcohol, carnaubyl alcohol, ceryl alcohols, and melissyl alcohol; polyhydric alcohols such as sorbitol; esters of fatty acids such as palmitic acid, stearic acid, behenic acid, and montanic acid and alcohols such as stearyl alcohol, aralkyl alcohol, behenyl alcohol, carnaubyl alcohol, ceryl alcohol, and melissyl alcohol; fatty acid amides such as linoleic acid amide, oleic acid amide, and lauric acid amide; saturated fatty acid bis-amides such as methylene bis-stearic acid amide, ethylene bis-capric acid amide, ethylene bis-lauric acid amide, and hexamethylene bis-stearic acid amide; unsaturated fatty acid amides such as ethylene bis-oleic acid amide, hexamethylene bis-oleic acid amide, N,N'-dioleyl adipic acid amide, and N,N'-dioleyl sebacic acid amide; aromatic bis-amides such as m-xylene bis-stearic acid amide and N,N'-distearyl isophthalic acid amide; aliphatic metal salts such as calcium stearate, calcium laurate, zinc stearate, and magnesium stearate (typically those referred to as metallic soaps); waxes obtained by grafting vinyl monomers such as styrene and acrylic acid onto aliphatic hydrocarbon waxes; partial esterification product of fatty acids and polyhydric alcohols such as behenic acid monoglyceride; and methyl ester compounds having a hydroxy group which are obtained by hydrogenation of vegetable oils and fats.

Among these waxes, from the standpoint of improving low-temperature fixability and hot offset resistance, hydrocarbon waxes such as polypropylene of a low molecular weight, paraffin waxes, and Fischer-Tropsch waxes, and fatty acid ester waxes such as carnauba wax are preferred. In the present invention, hydrocarbon waxes are more preferred from the standpoint of further improving hot offset resistance.

In the present invention, the amount of the wax is preferably at least 1.0 part by mass and not more than 20.0 parts by mass per 100.0 parts by mass of the binder resin.

The peak temperature of the highest endothermic peak of the wax measured using differential scanning calorimetry (DSC) is preferably at least 45° C. and not more than 140° C., more preferably at least 70° C. and not more than 100° C. This range of the peak temperature of the maximum endothermic peak of the wax is more preferable because both the blocking resistance and hot offset resistance of the toner are ensured.

In the present invention, the toner particle may include a colorant. Examples of suitable colorants are presented below.

Examples of colorants for a black toner include carbon black and colorants adjusted to a black color by using a yellow colorant, a magenta colorant, and a cyan colorant. Pigments may be individually used for the colorants, but from the standpoint of full-color image quality, it is preferred that dyes be used together with pigments.

Examples of pigments for magenta toners are presented below. C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C. I. Pigment Violet 19; and C. I. Vat Red 1, 2, 10, 13, 15, 23, 29, and 35.

Examples of dyes, for magenta toners are presented below. C. I. Solvent Red 1, 3, 8, 23, 24, 25, 27, 30, 49, 81, 82, 83, 84, 100, 109, and 121; C. I. Disperse Red 9; C. I. Solvent Violet 8, 13, 14, 21, and 27; oil-soluble dyes such as C. I. Disperse Violet 1; and basic dyes such as C. I. Basic Red 1, 2, 9, 12, 13, 14, 15, 17, 18, 22, 23, 24, 27, 29, 32, 34, 35, 36, 37, 38, 39, and 40; and C. I. Basic Violet 1, 3, 7, 10, 14, 15, 21, 25, 26, 27, and 28.

Examples of pigments for cyan toners are presented below. C. I. Pigment Blue 2, 3, 15:2, 15:3, 15:4, 16, and 17; C. I. Vat Blue 6; C. I. Acid Blue 45, and copper phthalocyanine pigments in which 1 to 5 phthalimidomethyl groups are substituted into the phthalocyanine skeleton.

C. I. Solvent Blue 70 is suitable as a dye for cyan toners.

Examples of pigments for yellow toners are presented below. C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185; C. I. Vat Yellow 1, 3, and 20.

C. I. Solvent Yellow 162 is suitable as a dye for yellow toners.

The amount of the colorant is preferably at least 0.1 parts by mass and not more than 30.0 parts by mass per 100.0 parts by mass of the binder resin.

In the present invention, the toner particle may optionally include a charge control agent.

Well-known agents can be used as the charge control agent. In particular, metal compounds of aromatic carboxylic acids that are colorless, have a high toner charging speed, and can stably maintain a constant charge quantity are preferred.

Examples of negative charge control agents include salicylic acid metal compounds, naphthoic acid metal compounds, dicarboxylic acid metal compounds, polymer-type compounds having sulfonic acid or carboxylic acid in a side chain, polymer-type compounds having a sulfonic acid salt or a sulfonic acid ester in a side chain, polymer-type compounds having a carboxylic acid salt or a carboxylic acid ester in a side chain, boron compounds, urea compounds, silicon compounds, and calixarenes.

Examples of positive charge control agents include quaternary ammonium salts, polymer-type compounds having a quaternary ammonium salt in a side chain, guanidine compounds, and imidazole compounds.

The charge control agent may be added internally or externally to the toner particle.

The amount of the charge control agent is preferably at least 0.2 parts by mass and not more than 10.0 parts by mass per 100.0 parts by mass of the binder resin.

The toner of the present invention may optionally include inorganic fine particles.

The inorganic fine particles may be added internally to the toner particle or may be mixed as an external additive with the toner particle.

When the particles are included as an external agent, inorganic fine particles such as silica fine particles, titanium oxide fine particles, and aluminum oxide fine particles are preferred.

The inorganic fine particles are preferably hydrophobized with a hydrophobic agent such as a silane compound, a silicone oil, or a mixture thereof.

When the inorganic fine particles are used for improving the flowability of the toner, the specific surface area of the particles is preferably at least 50 m$^2$/g and not more than 400 m$^2$/g.

Meanwhile when the inorganic fine particles are used for improving the durability of the toner, the specific surface area of the particles is preferably at least 10 m$^2$/g and not more than 50 m$^2$/g.

The inorganic fine particles with the specific surface area within the abovementioned ranges may be used in combinations for improving both the flowability and the durability.

When the inorganic fine particles are included as an external additive, the particles are preferably contained at least 0.1 parts by mass and not more than 10.0 parts by mass per 100.0 parts by mass of the toner particle. A well-known mixer such as a Henschel mixer may be used for mixing the toner particle with the inorganic particles.

The toner of the present invention can be also used as a one-component developer, but in order to improve further the dot reproducibility, and also in order to ensure image stability over a long period of time, the toner can be also mixed with a magnetic carrier and used as a two-component developer.

Examples of magnetic carriers include iron oxides; particles of metals such as iron, lithium, calcium, magnesium, nickel, copper, zinc, cobalt, manganese, chromium, and rare earth metals, particles of alloys thereof, and particles of oxides thereof; magnetic bodies such as ferrites; and magnetic body-dispersed resin carriers (so-called resin carriers) including a magnetic body and a binder resin maintaining the magnetic body in a dispersed state. Carriers which are generally well known can be used.

When the toner of the present invention is used as a two-component developer by mixing with a magnetic carrier, the mixing ratio of the magnetic carrier and toner is preferably such that the toner concentration in the two-component developer is preferably at least 2 mass % and not more than 15 mass %, more preferably at least 4 mass % and not more than 13 mass %.

In the present invention, a method for producing the toner particle is not particularly limited, but in order to exhibit sufficiently the effect of the wax dispersant, it is preferred that a melt kneading method or an emulsion aggregation method be used. Further, from the standpoint of wax dispersibility, it is more preferred that the melt kneading method be used.

Here, the melt-kneading method is a method for producing a toner particle that includes a step of melting and kneading a mixture including a binder resin, a wax, and a wax dispersant for a toner to obtain a melt-kneaded product (referred to hereinbelow simply as "melt kneading step").

Where the toner particle is produced through a melt kneading step, the dispersibility of wax is improved.

In the melt kneading step, the starting materials of the toner particle (in particular, the binder resin, wax dispersant, and wax) are actively mixed under the effect of heat and shearing, thereby improving the dispersibility of the wax. As a result, the wax in the toner particle is finely dispersed and hot offset resistance is improved.

Further, even when the toner is left to stand at a high temperature and high humidity, the wax dispersant suppresses the elution of wax to the toner particle surface, the blocking resistance of the toner is improved, and the charging performance is not lowered.

In the present invention, the method for producing a toner particle preferably includes a step of cooling the melt-kneaded product obtained in the melt kneading step, pulverizing, and heat treating the obtained resin particles (simply referred to hereinbelow as "heat treatment step").

Where the heat treatment step is performed, the charging performance and blocking resistance are improved as compared with those of the conventional wax dispersants.

Usually, when the heat treatment step is performed, since a high-adhesivity wax elutes to the toner particle surface, the blocking resistance of the toner is reduced and charging defects occur due to the reduced flowability of the toner.

However, when the toner particle including the wax dispersant of the present invention is heat treated, since the wax and the hydrophobic wax dispersant migrate at the same time to the toner particle surface, the toner flowability is not degraded and the charging performance does not deteriorate even at a high temperature and high humidity. Further, since the wax dispersant of the present invention has a structural segment derived from a bulky saturated alicyclic compound, elution of the wax can be suppressed during the heat treatment and blocking resistance of the toner is improved.

The procedure for producing the toner particle by using the melt kneading method will be explained hereinbelow.

First, in a raw material mixing step, the binder resin including a crystalline polyester resin and an amorphous polyester resin, etc., wax, and wax dispersant for a toner are weighed as toner raw materials in predetermined amounts, blended, and mixed.

Examples of devices that are suitable for mixing include a Henschel mixer (manufactured by Nippon Coke & Engineering Co., Ltd.); a Super mixer (manufactured by Kawata MFG Co., Ltd.); Ribocone (manufactured by Okawara MFG. Co., Ltd.); Nauta mixer, Turbulizer, Cyclomix (manufactured by Hosokawa Micron Corporation); a spiral pin mixer (Pacific Machinery & Engineering Co., Ltd.); and Loedige mixer (manufactured by Matsubo Corporation).

The resulting mixture is then melted and kneaded to melt the resins, and the wax and wax dispersant for a toner are dispersed therein (melt kneading step).

Examples of devices that are suitable for melt kneading include a TEM-type extruder (manufactured by Toshiba Machine Co., Ltd.); a TEX twin-screw kneader (manufactured by The Japan Steel Works, Ltd.); a PCM kneader (manufactured by Ikegai Ironworks Corp.); and a Kneadex (manufactured by Mitsui Mining Co., Ltd.). Continuous kneading machines such as single-screw or twin-screw extruders are preferred over batch kneading machines because they enable continuous production.

The melt-kneaded product thus obtained is then rolled with two rolls, etc. and cooled by water cooling, etc.

The resulting cooled product is pulverized to the desired particle diameter. Initially, coarse grinding is performed with a crusher, a hammer mill, or a feather mill, and then fine grinding is performed with a Kryptron system (manufactured by Kawasaki Heavy Industries, Ltd.) and a Super rotor (manufactured by Nisshin Engineering Inc.) to obtain resin particles.

The resulting resin particles are then classified into a desired particle diameter and may be used as toner particles. Examples of devices that are suitable for classification include Turboplex, Faculty, TSP, TTSP (manufactured by Hosokawa Micron Corporation); and Elbow Jet (manufactured by Nittetsu Mining Co., Ltd.).

The obtained resin particles are subjected to heat treatment and may be used as toner particles.

Where coarse particles are present after the implementation of the heat treatment, the coarse particles may be removed, if necessary, by classification or sieving. The abovementioned devices can be used for the classification. Meanwhile, examples of devices that are suitable for sieving include Ultra Sonic (manufactured by Koei Sangyo Co., Ltd.); Resonasieve and Gyrosifter (manufactured by Tokuju Corporation); Turbo Screener (manufactured by Turbo Kogyo Co., Ltd.); and Hi-Bolter (manufactured by Toyo Hitec Co., Ltd.).

Meanwhile, inorganic fine particles, or the like, may be optionally added to the resulting resin particles prior to the heat treatment step.

Specifically illustrated hereinbelow is a method for heat treating the resin particles by using the heat treatment device depicted in FIG. 1.

Resin particles dispensed in a predetermined amount by a raw material dispensing means 1 are let into an introducing tube 3 disposed on the vertical line of the raw material supply means by the compressed gas adjusted by a compressed gas flow rate adjusting means 2. A resin particle that has passed through the introducing tube 3 is uniformly dispersed by a conical protruding member 4 provided at the center portion of the raw material supply means and then guided to radially spreading supply pipes 5, which are oriented in eight directions, and guided into a treatment chamber 6 where the heat treatment is to be performed.

At this time, the flow of the resin particles supplied into the treatment chamber 6 is regulated by a regulating means 9 for regulating the flow of resin particles which is provided in the treatment chamber 6. As a result, the resin particles supplied into the treatment chamber 6 are heat-treated, while rotating inside the treatment chamber 6, and then cooled.

Hot air for heat treating the supplied resin particles is supplied from a hot air supply means 7 and distributed by a distribution member 12. The hot air is introduced into the treatment charmer 6, while being rotated spirally by a rotating member 13 for rotating the hot air. As a configuration therefor, the rotating member 13 for rotating the hot air has a plurality of blades, and the rotation of the hot air can be controlled by changing the number and mounting angles of the blades (the reference numeral 11 denotes a hot air supply means outlet). The temperature of the hot air supplied into the treatment charmer 6, when measured in the outlet of the hot air supply means 7, is preferably at least 100° C. and not more than 300° C., more preferably at least 130° C. and not more than 170° C. Where the temperature in the outlet of the hot air supply means 7 is within the abovementioned ranges, the particles can be uniformly treated, while preventing fusion and coalescence of the resin particles caused by overheating.

The hot air is supplied from the hot air supply means 7. The heat-treated resin particles which have been subjected to the heat treatment are cooled by cold air supplied from a cold air supply means 8. The temperature of the cold air supplied from the cold air supply means 8 is preferably at least −20° C. and not more than 30° C. Where the temperature of the cold air is within the abovementioned range, the heat-treated resin particles can be cooled efficiently, and the heat-treated resin particles can be prevented from fusion and coalescence without inhibiting the uniform heat treatment of the resin particles. The absolute moisture amount in the cold air is preferably at least 0.5 $g/m^3$ and not more than 15.0 $g/m^3$.

The heat-treated resin particles which have been cooled are recovered with a recovery means 10 located at the lower end of the treatment chamber 6. A blower (not depicted in the FIGURE) is provided at the tip of the recovery means 10 and configured to suck in and convey the particles.

A powder particle supply port 14 is provided such that rotation direction of the supplied resin particles and the rotation direction of the hot air coincide, and the recovery means 10 is also provided in the tangential direction to the outer peripheral portion of the treatment chamber 6 such as to maintain the rotation direction of the rotated resin particles. Further, the cold air supplied from the cold air supply means 8 is supplied from the horizontal and tangential direction from the outer peripheral portion of the device to the inner peripheral surface of the treatment charmer. The rotation direction of the pre-heat-treated resin particles supplied from the powder particle supply port 14, the rotation direction of the cold air supplied from the cold air supply means 8, and the rotation direction of the hot air supplied from the hot air supply means 7 are all in the same direction. As a result, the swirling flow inside the device is enhanced without inducing turbulence in the treatment charmer, a strong centrifugal force is applied to the pre-heat-treated resin particles, and dispersibility of the pre-heat-treated resin particles is further improved. It is therefore possible to obtain heat-treated resin particles of uniform shape with few coalesced particles.

In the present invention, the average circularity of the toner is preferably at least 0.960, and more preferably at least 0.965. Where the average circularity of the toner is within the abovementioned ranges, the transfer efficiency of the toner is improved.

Methods for measuring various physical properties of the toner and raw materials will be described hereinbelow.

<Measurement of Glass Transition Temperature (Tg) of the Resin>

The glass transition temperature of the resin is measured according to ASTM D3418-82 by using a differential scanning calorimeter "Q2000" (manufactured by TA Instruments.).

Temperature correction of the device detector is performed using the melting points of indium and zinc, and the heat of fusion of indium is used for correcting the heat quantity.

More specifically, about 5 mg of the resin is accurately weighed and placed in an aluminum pan. An empty aluminum pan is used as a reference. The measurements are conducted at a rate of temperature rise of 10° C./min in a measurement range from at least 30° C. and not more than 180° C.

After raising the temperature to 180° C. and holding for 10 min, the temperature is lowered to 30° C. and then again raised. In the second process of raising the temperature, a specific heat change is obtained in a temperature range from at least 30° C. and not more than 100° C. The temperature at a point where the curve of the step-like change portion of glass transition in the DSC curve intersects the line which is equidistant, in the vertical axis direction, from the lines obtained by extending the base lines before and after the specific heat change at this time is taken as the glass transition temperature of the resin (Tg: ° C.).

<Measurement of Peak Temperatures of Endothermic Peaks of Wax and Crystalline Polyester Resin>

The peak top temperatures of the endothermic peaks of the wax and crystalline polyester resin are measured using a differential scanning calorimeter "Q1000" (manufactured by TA Instruments.) according to ASTM D3418-82.

Temperature correction of the device detector is performed using the melting points of indium and zinc, and heat of fusion of indium is used for correction of heat quantity.

More specifically, about 5 mg of the sample is accurately weighed and placed in a silver pan. The measurement is conducted once. An empty silver pan is used as a reference. The measurement conditions are presented below.

rate of temperature rise: 10° C./min
measurement start temperature: 20° C.
measurement end temperature: 180° C.

Where the toner is taken as the sample, when the endothermic peak (endothermic peak derived from the binder resin) does not overlap with the endothermic peak of the resin other than the crystalline resin and the wax, the obtained maximum endothermic peaks can be handled, as is, as the endothermic peaks derived from the wax and crystalline resin.

Meanwhile, where the toner is taken as the sample, the determination of the endothermic peak of the wax and the endothermic peak of the crystalline resin is performed by extracting the wax from the toner by Soxhlet extraction using a hexane solvent, the scanning calorimetry measurement of the wax alone is performed by the abovementioned method, and the obtained endothermic peak is compared with the endothermic peak of the toner.

The maximum endothermic peak, as referred to herein, means a peak with the maximum endothermal amount when there is a plurality of peaks. The peak temperature of the maximum endothermic peak is taken as the melting point.

<Measurement of Weight-Average Molecular Weight (Mw)>

The molecular weight distribution of the wax dispersant, etc., is measured in the following manner by using gel permeation chromatography (GPC).

Initially, the sample is placed in tetrahydrofuran (THF), left to stand for several hours at 25° C., and then vigorously shaken to mix well with THF. The system is then left to stand under stationary conditions for 12 h or more till there is no coalescence of the sample.

The standing time in THF in this case is 24 h. The resulting solution is then passed through a sample processing filter (pore size at least 0.2 m and not more than 0.5 μm; for example Myshori disk H-25-2 (manufactured by Tosoh Corporation)), and the solution that passed is taken as a GPC sample.

The sample concentration is adjusted to at least 0.5 mg/mL and not more than 5.0 mg/mL. The measurements are conducted under the following conditions by using the sample solution.

A column is stabilized in a heat chamber at 40° C., tetrahydrofuran (THF) as a solvent is allowed to flow at a rate of 1 mL per minute into the column at this temperature, and about 100 μL of the sample solution is injected for measurements.

A combination of a plurality of commercially available polystyrene gel columns is used as the column. Thus, a combination of shodex GPC KF-801, 802, 803, 804, 805, 806, 807, and 800P manufactured by Showa Denko K.K., or a combination of TSKgel G1000H ($H_{XL}$), G2000H ($H_{XL}$), G3000H ($H_{XL}$), G4000H ($H_{XL}$), G5000H ($H_{XL}$), G6000H ($H_{XL}$), G7000H ($H_{XL}$), and TSKgurd column manufactured by Tosoh Corporation are used.

When the molecular weight of the sample is measured, the molecular weight distribution of the sample is calculated from the relationship between the count value and the logarithmic value of a calibration curve prepared using several kinds of monodisperse polystyrene standard samples.

Samples with a molecular weight of about $1 \times 10^2$ to $1 \times 10^7$ manufactured by Tosoh Corporation or Showa Denko K.K., Ltd. are used as the standard polystyrene samples for the preparation of the calibration curve. At least about 10 standard polystyrene samples are used. The detector may be an RI (refractive index) detector.

<Measurement of Weight-Average Particle Diameter (D4) of Toner Particles>

The weight-average particle diameter (D4) of the toner particles is measured with the effective measurement channel number of 25,000, and measurement data analysis and calculations are performed by using a precision particle diameter distribution measuring device "Coulter Counter Multisizer 3®" (manufactured by Beckman Coulter, Inc.) based on a pore electrical resistance method and provided with a 100-μm aperture tube, and dedicated software "Beckman Coulter Multisizer 3 Version 3.51" (manufactured by Beckman Coulter, Inc.) included for setting the measurement conditions and analyzing the measurement data.

An aqueous electrolytic solution used for the measurements is obtained by dissolving reagent-grade sodium chloride in ion-exchanged water to a concentration of about 1 mass %. For example, "ISOTON II" (manufactured by Beckman Coulter, Inc.) can be used.

The dedicated software is set in the following manner before the measurements and analysis are performed.

At the "Screen for Changing Standard Measurement Method (SOM)" of the dedicated software, the total count number of the control mode is set to 50,000 particles, the number of measurement cycles is set to 1, and the Kd value is set to a value obtained using the "Standard Particle 10.0 μm" (Beckman Coulter., Inc.). A threshold and a noise level are automatically set by pressing the measurement button of the threshold/noise level. Further, the current is set to 1600 μA, the gain is set to 2, the aqueous electrolytic solution is set to ISOTON II, and "Check" is entered for the flush of the aperture after the measurements.

In the "Conversion Setting Screen from Pulse to Particle Diameter" of the dedicated software, a bin interval is set to a logarithmic particle diameter, a particle diameter bin is set to 256, and the particle diameter range is set from at least 2 μm and not more than 60 μm.

A specific measurement method is described below.

(1) A total of about 200 mL of the aqueous electrolytic solution is placed in a 250-mL round-bottom glass beaker specifically designed for Multisizer 3, and set on a sample stand. Agitation with a stirrer rod is performed counterclockwise at 24 rev/s. The dirt and air bubbles in the aperture tube are removed by the "Aperture Flush" function of the dedicated software.

(2) A total of about 30 mL of the aqueous electrolytic solution is placed in a 100-mL flat-bottom glass beaker, and about 0.3 mL of a diluted solution obtained by about 3-fold, by mass, dilution of "Contaminon N" (a 10 mass % aqueous solution of a neutral detergent for precision measurement device which has pH-7 and includes a nonionic surfactant, an anionic surfactant, and an organic builder; manufactured by Wako Pure Chemical Industries, Ltd.) with ion-exchanged water is added as a dispersant thereto.

(3) A predetermined amount of ion-exchanged water is placed into a water tank of an ultrasonic disperser "Ultrasonic Dispersion System Tetora 150" (manufactured by Nikkaki Bios Co., Ltd.) which has an electrical output of 120 W and includes two oscillators with an oscillation frequency of 50 kHz that are built in a state with a 180-degree shift by phase, and about 2 mL of the Contaminon N is added to the water tank.

(4) The beaker, as disclosed in clause (2) above, is set in the beaker fixing hole of the ultrasonic disperser, and the ultrasonic disperser is actuated. The height position of the beaker is adjusted such as to maximize the resonance state of the liquid surface of the aqueous electrolytic solution inside the beaker.

(5) In a state in which the aqueous electrolytic solution inside the beaker, as disclosed in clause (4) above, is irradiated with ultrasonic waves, about 10 mg of the toner particles is added portionwise to the aqueous electrolytic solution and dispersed. The ultrasonic dispersion treatment is then continued for 60 s. During the ultrasonic dispersion, the temperature of water in the water tank is adjusted, as appropriate, to be from at least 10° C. and not more than 40° C.

(6) The aqueous electrolytic solution, as disclosed in clause (5) above, in which the toner has been dispersed, is dropwise added with a pipette to the round-bottom beaker, as disclosed in clause (1) above, which was placed in the sample stand, and the measured concentration is adjusted to about 5%. The measurements are performed till the number of measured particles reaches 50,000.

(7) The weight-average particle diameter (D4) is calculated by analyzing the measurement data with the dedicated software included with the device. The "Average Diameter" on the analysis/volume statistical value (arithmetic mean) screen when setting the graph/volume % in the dedicated software is the weight-average particle diameter (D4).

<Measurement of the Average Circularity>

The average circularity of the toner particles is measured with a flow-type particle image analyzer "FPIA-3000" (manufactured by Sysmex Corporation) under measurement and analysis conditions at the time of calibration operation.

The specific measurement method is described below. Initially, about 20 mL of ion-exchanged water from which solid impurities have been removed in advance is placed in a glass container. About 0.2 mL of a diluted solution obtained by about 3-fold, by mass, dilution of "Contaminon N" (a 10 mass % aqueous solution of a neutral detergent for precision measurement device which has pH 7 and includes a nonionic surfactant, an anionic surfactant, and an organic builder; manufactured by Wako Pure Chemical Industries, Ltd.) with ion-exchanged water is added as a dispersant thereto. About 0.02 g of the measurement sample is then added and dispersion treatment is performed for 2 min by using an ultrasonic disperser to obtain a dispersion for measurements. At this time, appropriate cooling is performed such that the temperature of the dispersion becomes at least 10° C. and not more than 40° C. A desktop ultrasonic cleaner disperser "VS-150" (manufactured by VELVO-CLEAR) with an oscillation frequency of 50 kHz and an electrical output of 150 W is used as an ultrasonic disperser, a predetermined amount of ion-exchanged water is placed into a water tank, and about 2 mL of Contaminon N is added to the water tank.

A flow-type particle image analyzer with an installed standard objective lens (10 times) is used for the measurements, and a particle sheath "PSE-900A" (manufactured by Sysmex Corporation) is used as a sheath liquid. The dispersion prepared in accordance with the above-described procedure is introduced in the flow-type particle image analyzer, and in a HPF measurement mode, a total of 3000 toner particles are measured in a total count mode. The binarization threshold at the time of particle analysis is set to 85%, the analyzed particle diameter is limited to at least 1.985 μm and less than 39.69 μm, as a circle equivalent diameter, and the average circularity of the toner particles is determined.

In the measurements, automatic focusing is performed using standard latex particles ("RESEARCH AND TEST PARTICLES Latex Microsphere Suspensions 5200A" (manufactured by Duke Scientific Corp.) diluted with ion-exchanged water) before the measurements are started. It is preferred that the focusing be thereafter performed every 2 hours after the measurements are started.

The flow-type particle image analyzer used in the examples of the present application was calibrated by Sysmex Corporation and received a calibration certificate issued by Sysmex Corporation. The measurements were conducted under the measurement and analysis conditions at the time of the reception of the calibration certificate, except that the analyzed particle diameter was limited to at least 1.985 μm and less than 39.69 μm, as a circle equivalent diameter.

<Measurement of Acid Value of Wax Dispersant>

The acid value of the wax dispersant is measured by the following method. The acid value is the number of milligrams of potassium hydroxide required to neutralize the acid contained in 1 g of the sample. The acid value of the resin is measured according to JIS K0070-1992. The specific procedure of the measurement is as follows.

(1) Preparation of Reagent

A phenolphthalein solution is obtained by dissolving 1.0 g of phenolphthalein in 90 mL of ethyl alcohol (95 vol %) and a adding deionized water to 100 mL.

A total of 7 g of reagent-grade sodium chloride is dissolved in 5 mL of deionized water and 1 L is obtained by adding ethyl alcohol (95 vol %). The solution is placed in an alkali-resistant container and left to stand therein for 3 days such that contact with carbon dioxide, or the like, is prevented, and then filtered to obtain a potassium hydroxide solution. The resulting potassium hydroxide solution is stored in an alkali-resistant container. A total of 25 mL of 0.1 mol/L hydrochloric acid is taken in a triangular flask, a few drops of the phenolphthalein solution are added, titration is performed with the potassium hydroxide solution, and the factor of the potassium hydroxide solution is determined from the amount of the potassium hydroxide solution needed for neutralization. The 0.1 mol/L hydrochloric acid is prepared for use according to JIS K 8001-1998.

(2) Operations (A) Main Test

An accurately weight sample, 2.0 g, of the wax dispersant is placed in a 200-mL triangular flask, and 100 mL of a mixed solution of toluene:ethanol (4:1) is added to dissolve the wax dispersant over a period of 5 h. A few drops of the phenolphthalein solution as an indicator are then added, and titration is performed using a potassium hydroxide solution. The end point of the titration is when the thin red color of the indicator is maintained for about 30 s.

(B) Blank Test

The titration is performed by the same operations, except that the sample is not used (that is, only the mixed solution of toluene:ethanol (4:1) is used).

(3) The results obtained are substituted in the following equation and the acid value is calculated.

$$A=[(C-R)\times f\times 5.61]/S$$

Here, A: acid value (mg KOH/g); B: added amount (mL) of potassium hydroxide solution in the blank test; C: added amount (mL) of potassium hydroxide solution in the main test; f: factor of the potassium hydroxide solution; and S: sample (g).

EXAMPLES

The present invention will be explained hereinbelow in greater detail with reference to production examples and embodiments, but the present invention is not limited thereto. Parts and percentages in the following formulations are all on the mass basis unless specified otherwise.

Production Example of Wax Dispersant A1

A total of 300.0 parts of xylene and 10.0 parts of polypropylene (melting point 90° C.) were placed in an autoclave reaction vessel equipped with a thermometer and a stirrer and the polypropylene was thoroughly dissolved. After nitrogen substitution, a mixed solution of 68.0 parts of styrene, 5.0 parts of methacrylic acid, 5.0 parts of cyclohexyl methacrylate, 12.0 parts of butyl acrylate, and 250.0 parts of xylene was dropwise added over 3 h at 180° C. to conduct polymerization. The reaction system was then held for 30 min at this temperature, the solvent was removed, and a wax dispersant A1 was obtained. The composition, weight-average molecular weight, and acid value of the obtained wax dispersant are shown in Table 1. The SP value of the wax dispersant A1 was 10.0.

Production Example of Wax Dispersant A2

A total of 300.0 parts of xylene and 10.0 parts of polypropylene (melting point 90° C.) were placed in an autoclave reaction vessel equipped with a thermometer and a stirrer and the polypropylene was thoroughly dissolved. After nitrogen substitution, a mixed solution of 63.0 parts of styrene, 10.0 parts of methacrylic acid, 5.0 parts of cyclohexyl methacrylate, 12.0 parts of butyl acrylate, and 250.0 parts of xylene was dropwise added over 3 h at 180° C. to conduct polymerization. The reaction system was then held for 30 min at this temperature, the solvent was removed, and a wax dispersant A2 was obtained. The composition, weight-average molecular weight, and acid value of the obtained wax dispersant are shown in Table 1. The SP value of the wax dispersant A2 was 10.0.

Production Example of Wax Dispersant A3

A total of 300.0 parts of xylene and 10.0 parts of polypropylene (melting point 90° C.) were placed in an autoclave reaction vessel equipped with a thermometer and a stirrer and the polypropylene was thoroughly dissolved. After nitrogen substitution, a mixed solution of 73.0 parts of styrene, 5.0 parts of cyclohexyl methacrylate, 12.0 parts of butyl acrylate, and 250.0 parts of xylene was dropwise added over 3 h at 180° C. to conduct polymerization. The reaction system was then held for 30 min at this temperature, the solvent was removed, and a wax dispersant A3 was obtained. The composition, weight-average molecular weight, and acid value of the obtained wax dispersant are shown in Table 1. The SP value of the wax dispersant A3 was 10.0.

Production Example of Wax Dispersants A4 to A7

Wax dispersants A4 to A7 were obtained by performing the same operations as in the production example of wax dispersant A3, except that the conditions in the production example of wax dispersant A3 were changed, as appropriate, to obtain the weight-average molecular weights (Mw) such as shown in Table 1. The compositions, weight-average molecular weights, and acid values of the obtained wax dispersants are shown in Table 1.

Production Example of Wax Dispersants A8 to A10

Wax dispersants A8 to A10 were obtained by performing the same operations as in the production example of wax dispersant A3, except that the conditions in the production example of wax dispersant A3 were changed, as appropriate, to obtain the weight-average molecular weights (Mw) and hydrocarbon compounds such as shown in Table 1. The compositions, weight-average molecular weights, and acid values of the obtained wax dispersants are shown in Table 1.

Production Example of Wax Dispersants A11 to A14

Wax dispersants A11 to A14 were obtained by performing the same operations as in the production example of wax dispersant A3, except that the conditions in the production example of wax dispersant A3 were changed, as appropriate, to obtain the weight-average molecular weights (Mw), hydrocarbon compounds, and compositions of styrene-acrylic resins such as shown in Table 1. The compositions, weight-average molecular weights, and acid values of the obtained wax dispersants are shown in Table 1.

Production Example of Wax Dispersants A15 to A19

Wax dispersants A15 to A19 were obtained by performing the same operations as in the production example of wax dispersant A3, except that the conditions in the production example of wax dispersant A3 were changed, as appropriate, to obtain, the weight-average molecular weights (Mw), hydrocarbon compounds, and compositions of styrene-acrylic resins such as shown in Table 1. The compositions, weight-average molecular weights, and acid values of the obtained wax dispersants are shown in Table 1.

Production Example of Wax-Dispersant A20

A total of 600.0 parts of xylene and 120.0 parts of polyethylene (melting point 128° C.) were placed in an autoclave reaction vessel equipped with a thermometer and a stirrer and these was thoroughly dissolved. After nitrogen substitution, a mixed solution of 1900.0 parts of styrene, 170.0 parts of acrylonitrile, 240.0 parts of monobutyl maleate, 78.0 parts of di-t-butylperoxyhexahydroterephtha-late, 24.0 parts of butyl acrylate, and 455.0 parts of xylene was dropwise added over 2 h at 160° C. to conduct polymerization. The reaction system was then held for 30 min at this temperature, the solvent was removed, and a wax dispersant A20 was obtained. The SP value of the wax dispersant A20 was 10.4. The composition, weight-average molecular weight, and acid value of the obtained wax dispersant are shown in Table 1.

Production Example of Wax Dispersant A21

A wax dispersant A21 was produced by performing the same operations as in the production example of wax dispersant A20, except that the composition of the styrene-acrylic resin depicted in Table 1 was used. The composition, weight-average molecular weight, and acid value of the obtained wax dispersant are shown in Table 1.

TABLE 1

| | Compound composition | | | | | | | | | |
|---|---|---|---|---|---|---|---|---|---|---|
| | Hydrocarbon compound | | Saturated alicyclic compound | | Styrene-acrylic resin | | | | Weight-average molecular weight (Mw) | Acid value (mg KOH/g) |
| Wax dispersant | Type | Melting point (° C.) | Type | Carbon number of alicyclic portion | Compound according to Formula (2) | | Other compounds | | | |
| | | | | | Type | n | | | | |
| A1 | Polypropylene | 90 | Cyclohexyl methacrylate | 6 | Butyl acrylate | 4 | Styrene | Methacrylic acid | 15000 | 30 |
| A2 | Polypropylene | 90 | Cyclohexyl methacrylate | 6 | Butyl acrylate | 4 | Styrene | Methacrylic acid | 15000 | 60 |
| A3 | Polypropylene | 90 | Cyclohexyl methacrylate | 6 | Butyl acrylate | 4 | Styrene | | 15000 | 0 |
| A4 | Polypropylene | 90 | Cyclohexyl methacrylate | 6 | Butyl acrylate | 4 | Styrene | | 70000 | 0 |
| A5 | Polypropylene | 90 | Cyclohexyl methacrylate | 6 | Butyl acrylate | 4 | Styrene | | 5000 | 0 |
| A6 | Polypropylene | 90 | Cyclohexyl methacrylate | 6 | Butyl acrylate | 4 | Styrene | | 80000 | 0 |
| A7 | Polypropylene | 90 | Cyclohexyl methacrylate | 6 | Butyl acrylate | 4 | Styrene | | 4000 | 0 |
| A8 | Fischer-Tropsch wax | 105 | Cyclohexyl methacrylate | 6 | Butyl acrylate | 4 | Styrene | | 4000 | 0 |
| A9 | Fischer-Tropsch wax | 90 | Cyclohexyl methacrylate | 6 | Butyl acrylate | 4 | Styrene | | 4000 | 0 |
| A10 | Paraffin wax | 77 | Cyclohexyl methacrylate | 6 | Butyl acrylate | 4 | Styrene | | 4000 | 0 |
| A11 | Paraffin wax | 77 | Cyclohexyl methacrylate | 6 | Isobutyl acrylate | 4 | Styrene | | 4000 | 0 |
| A12 | Paraffin wax | 77 | Cyclohexyl methacrylate | 6 | 2-Ethyl hexyl acrylate | 7 | Styrene | | 4000 | 0 |
| A13 | Paraffin wax | 77 | Cyclohexyl methacrylate | 6 | Ethyl acrylate | 2 | Styrene | | 4000 | 0 |
| A14 | Paraffin wax | 77 | Cyclohexyl methacrylate | 6 | Methyl acrylate | 1 | Styrene | | 4000 | 0 |
| A15 | Paraffin wax | 77 | Cycloheptyl methacrylate | 7 | Methyl acrylate | 1 | Styrene | | 4000 | 0 |
| A16 | Paraffin wax | 77 | cyclooctyl methacrylate | 8 | Methyl acrylate | 1 | Styrene | | 4000 | 0 |
| A17 | Paraffin wax | 77 | Cyclopentyl methacrylate | 5 | Methyl acrylate | 1 | Styrene | | 4000 | 0 |
| A18 | Paraffin wax | 77 | Cyclobutyl methacrylate | 4 | Methyl acrylate | 1 | Styrene | | 4000 | 0 |
| A19 | Paraffin wax | 77 | Cyclopropyl methacrylate | 3 | Methyl acrylate | 1 | Styrene | | 4000 | 0 |
| A20 | Polyethylene | 128 | None | None | Butyl acrylate | 4 | Styrene | Acrylo nitrile, Monobutyl maleate | 4000 | 0 |
| A21 | Polyethylene | 128 | None | None | None | — | Styrene | | 15000 | 0 |

Production Example of Crystalline Polyester Resin C1

1,6-Hexanediol: 34.5 parts (0.29 mol; 100.0 mol % on the basis of the total number of moles of the polyhydric alcohol)

Dodecanedioic acid: 65.5 parts (0.28 mol; 100.0 mol % on the basis of the total number of moles of the polyvalent carboxylic acid)

Tin 2-ethylhexanoate: 0.5 part

The abovementioned materials were weighed in a reaction vessel equipped with a cooling tube, a stirrer, a nitrogen introducing tube, and a thermocouple. After the atmosphere inside the reaction vessel was substituted with nitrogen gas, the temperature was gradually raised under stirring, and the reaction was conducted for 3 h at a temperature of 140° C. under stirring.

The pressure in the reaction vessel was then lowered to 8.3 kPa, and the reaction was conducted for 4 h while keeping the temperature at 200° C.

The pressure in the reaction vessel was then lowered to 5 kPa or less, and the reaction was conducted for 3 h at 200° C. to obtain a crystalline polyester resin C1.

Production of Crystalline Polyester Resins C2 to C5

Crystalline polyester resins C2 to C5 were obtained by performing the same operations as in the production example of crystalline polyester resin C1, except that the diol and dicarboxylic acid in the production example of crystalline polyester resin C1 were changed as indicated in Table 2.

TABLE 2

| Crystalline polyester resin | Diol | Dicarboxylic acid | SP value (SP1) |
| --- | --- | --- | --- |
| C1 | 1,6-Hexanediol (C6) | Dodecanedioic acid (C12) | 11.3 |
| C2 | 1,12-Dodecanediol (C12) | Adipic acid (C6) | 11.4 |
| C3 | 1,10-Decanediol (C10) | Sebacic acid (C10) | 11.0 |
| C4 | 1,6-Hexanediol (C6) | Sebacic acid (C10) | 11.5 |
| C5 | 1,6-Hexanediol (C6) | Fumaric acid (C4) | 12.7 |

Production Example of Amorphous Polyester Resin

Production Example of Amorphous Polyester Resin (L) of Low Molecular Weight

Polyoxypropylene (2.8)-2,2-bis(4-hydroxyphenyl) propane: 76.6 parts (0.17 mol; 100.0 mol % on the basis of the total number of moles of the polyhydric alcohol)

Terephthalic acid: 17.4 parts (0.10 mol; 72.0 mol % on the basis of the total number of moles of the polyvalent carboxylic acid)

Adipic acid: 6.0 parts (0.04 mol; 28.0 mol % on the basis of the total number of moles of the polyvalent carboxylic acid)

Titanium tetrabutoxide (esterification catalyst): 0.5 parts

The abovementioned materials were weighed in a reaction vessel equipped with a cooling tube, a stirrer, a nitrogen introducing tube, and a thermocouple.

After the atmosphere inside the reaction vessel was substituted with nitrogen gas, the temperature was gradually raised under stirring, and the reaction was conducted for 4 h at a temperature of 200° C. under stirring.

The pressure in the reaction vessel was then lowered to 8.3 kPa and maintained for 1 h. Cooling was then performed to 180° C. and the pressure was returned to atmospheric pressure (first reaction step).

tert-Butyl catechol (polymerization inhibitor): 0.1 part

The abovementioned material was then added, the pressure in the reaction vessel was lowered to 8.3 kPa, and the reaction was conducted for 1 h while keeping the temperature at 180° C. After it was confirmed that the softening point of the reaction product measured according to ASTM D36-86 reached 90° C., the temperature was lowered to stop the reaction (second reaction step), and an amorphous polyester resin (L) was obtained. The obtained amorphous polyester resin (L) had a peak molecular weight (Mp) of 5000, a softening temperature (Tm) of 90° C., and a glass transition temperature (Tg) of 52° C.

Production Example of Amorphous Polyester Resin (H) of High Molecular Weight

Polyoxyethylene (2.2)-2,2-bis(4-hydroxyphenyl)propane: 72.2 parts (0.20 mol; 100.0 mol % on the basis of the total number of moles of the polyhydric alcohol)

Terephthalic acid: 13.2 parts (0.08 mol; 48.0 mol % on the basis of the total number of moles of the polyvalent carboxylic acid)

Adipic acid: 8.2 parts (0.06 mol; 34.0 mol % on the basis of the total number of moles of the polyvalent carboxylic acid)

Titanium tetrabutoxide (esterification catalyst): 0.5 parts

The abovementioned materials were weighed in a reaction vessel equipped with a cooling tube, a stirrer, a nitrogen introducing tube, and a thermocouple.

After the atmosphere inside the reaction vessel was substituted with nitrogen gas, the temperature was gradually raised under stirring, and the reaction was conducted for 2 h at a temperature of 200° C. under stirring.

The pressure in the reaction vessel was then lowered to 8.3 kPa and maintained for 1 h. Cooling was then performed to 160° C. and the pressure was returned to atmospheric pressure (first reaction step).

Trimellitic acid: 6.3 parts (0.03 mol; 18.0 mol % on the basis of the total number of moles of the polyvalent carboxylic acid)

tert-Butyl catechol (polymerization inhibitor): 0.1 part

The abovementioned materials were then added, the pressure in the reaction vessel was lowered to 8.3 kPa, and the reaction was conducted for 15 h while keeping the temperature at 160° C. After it was confirmed that the softening point of the reaction product measured according to ASTM D36-86 reached 140° C., the temperature was lowered to stop the reaction (second reaction step), and an amorphous polyester resin (H) was obtained. The obtained amorphous polyester resin (H) had a peak molecular weight (Mp) of 8700, a softening temperature (Tm) of 142° C., and a glass transition temperature (Tg) of 57° C.

Production Example of Toner 1: Melt Kneading Method Including a Heat Treatment Step Amorphous polyester resin (L) of a low molecular weight: 70.0 parts Amorphous polyester resin (H) of a high molecular weight: 30.0 parts Crystalline polyester resin C1: 7.5 parts Wax dispersant A1: 5.0 parts Fischer-Tropsch wax: 5.0 parts (hydrocarbon wax, peak temperature of the maximum endothermic peak is 90° C.)

C. I. Pigment Blue 15:3: 7.0 parts 3,5-Di-t-butyl salicylic acid aluminum compound: 0.3 parts The abovementioned materials were mixed for a rotation time of 5 min at a revolution speed of 20 s$^{-1}$ by using a Henschel mixer (FM-75 type, manufactured by Mitsui Mining Co., Ltd.) and then melted and kneaded with a twin-screw kneader (PCM-30, manufactured by Ikegai Corp) set to a temperature of 150° C. The resulting melt-kneaded product was cooled and then coarsely crushed to not more than 1 mm with a hammer mill to obtain a crushed product. The resulting crushed product was finely pulverized with a mechanical pulverizer (T-250, manufactured by Turbo Kogyo Co., Ltd.). Classification was then performed with Faculty F-300 (manufactured by Hosokawa Micron Corporation) to obtain resin particles 1. The operating conditions of Faculty F-300 were set to a classifying rotor revolution speed of 130 s$^{-1}$ and a dispersion rotor revolution speed of 120 s$^{-1}$.

The resulting resin particles 1 were heat-treated with the heat treatment device shown in FIG. 1 to obtain toner particles 1. The operating conditions were set to a feed amount of 5 kg/h, a hot air temperature of 150° C., a hot air flow rate of 6 m$^3$/min, a cold air temperature −5° C., a cold air flow rate of 4 m$^3$/min, a blower air volume of 20 m$^3$/min, and an injection air flow rate of 1 m$^3$/min.

A total of 100 parts of toner particles 1, 1.0 part of hydrophobic silica (BET: 200 m$^2$/g), and 1.0 part of titanium oxide fine particles which were surface-treated with isobutyltrimethoxysilane (BET: 80 m$^2$/g) were mixed for a rotation time of 10 min at a revolution speed of 30 s$^{-1}$ with a Henschel mixer (FM-75 type, manufactured by Mitsui Mining Co., Ltd.) to obtain a toner 1.

In the DSC measurement of the resulting toner 1, an endothermic peak derived from a crystalline polyester resin was observed.

Production Example of Toner 2: Melt Kneading Method

A toner 2 was obtained by the same production method as the toner 1, except that the resin particles 1 were not subjected to heat treatment in the production example of the toner 1.

In the DSC measurement of the resulting toner 2, an endothermic peak derived from a crystalline polyester resin was observed.

Production Example of Toner 3: Emulsion Aggregation Method (Amorphous Polyester Resin Dispersion)
A total of 70.0 parts of the amorphous polyester resin (L) of a low molecular weight, 30.0 parts of the amorphous polyester resin (H) of a high molecular weight, and 400.0 parts of ion-exchanged water were pH adjusted to 8.5 with ammonia, and a Cavitron was then operated under a heating condition of 150° C. to obtain an amorphous polyester resin dispersion (solid fraction: 20%).
(Crystalline Polyester Dispersion)
A total of 80 parts of the crystalline polyester resin C1 and 720 parts of ion-exchanged water were placed into a stainless steel beaker and heated to 99° C. When the crystalline polyester resin C1 melted, it was stirred with a homogenizer. Then, emulsification and dispersion were performed while dropwise adding 2.0 parts of an anionic surfactant (Neogen RK, solid fraction: 20%; manufactured by DKS Co. LTD.) to obtain a crystalline polyester resin C1 dispersion (solid fraction: 10%).
(Colorant Dispersion)
  C. I. Pigment Blue 15:3: 1000 parts
  Anionic surfactant: 150 parts
  Ion-exchanged water: 9000 parts
The abovementioned materials were mixed and dissolved and then dispersed using a high-pressure impact type dispersing machine.
The volume-average particle diameter D50 of the colorant particles in the resulting colorant dispersion was 0.16 μm, and the colorant concentration was 23%.

(Wax Dispersion)
  Fischer-Tropsch wax: 45 parts (hydrocarbon wax, peak temperature of the maximum endothermic peak is 90° C.)
  Wax dispersant A1: 45 parts
  Anionic surfactant: 5 parts
  Ion-exchanged water: 150 parts
The abovementioned materials were heated to 95° C., dispersed using a homogenizer, and then subjected to dispersion treatment with a pressure-discharge-type Gaulin homogenizer to prepare a wax dispersion (wax concentration: 20%) in which a wax with a volume-average particle diameter of 210 nm was dispersed.
  Amorphous polyester resin dispersion: 500 parts
  Crystalline polyester resin C1 dispersion: 75 parts
The abovementioned materials were mixed and dispersed with a homogenizer in a round stainless steel flask. A total of 0.15 part of poly(aluminum chloride) was added thereto, and the dispersing operation was continued with Ultra-Turrax.
Then,
  Colorant dispersion: 30.5 parts
  Wax dispersion: 25 parts
were added, 0.05 parts of poly(aluminum chloride) was further added, and the dispersing operation was continued with Ultra-Turrax.

A stirrer and a mantle heater were then installed, the temperature was raised to 60° C., while adjusting the revolution speed of the stirrer such that the slurry is sufficiently agitated, the system was held for 15 min at 60° C., the particle diameter was measured with Coulter Multisizer II (aperture diameter: 50 μm, manufactured by Beckman Coulter Inc.) every 10 min, while raising the temperature at 0.05° C./min, and when the volume-average particle diameter became 5.0 μm, 75 parts (additional resin) of the amorphous polyester resin dispersion was charged over 3 min.

After holding for 30 minutes after the charging, the pH was adjusted to 9.0 with a 5% aqueous solution of sodium hydroxide. The temperature was then raised to 96° C. at a rate of temperature rise of 1° C./min, while adjusting the pH to 9.0 for every 5° C., and the system was held at 96° C. The particle shape and surface properties were observed every 30 min with an optical microscope and a scanning electron microscope (FE-SEM). Since, the spheroidization occurred at the 5-th hour, the temperature was lowered to 20° C. at 1° C./min and the particles were solidified.

The reaction product was then filtered, washed thoroughly with ion-exchanged water, and then dried with a vacuum dryer to obtain toner particles 2.

A total of 1.0 part of hydrophobic silica (BET: 200 m$^2$/g) and 1.0 part of titanium oxide fine particles that were surface-treated with isobutyltrimethoxysilane (BET: 80 m$^2$/g) were mixed with 100 parts of the toner particles 2 with a Henschel mixer (FM-75 type, manufactured by Mitsui Mining Co., Ltd.) for a revolution time of 10 min at a revolution speed of 30 s$^{-1}$ to obtain a toner 3.

In the DSC measurement of the obtained toner 3, an endothermic peak derived from the crystalline polyester resin was observed.

Production Examples of Toners 4 and 5

Toners 4 and 5 were obtained by performing the same operations as in the production example of toner 3, except that the type of the wax dispersant in the production example of toner 3 was changed as indicated in Table 3.

In the DSC measurement of the obtained toners 4 and 5, an endothermic peak derived from the crystalline polyester resin was observed.

Production Examples of Toners 6 to 8

Toners 6 to 8 were obtained by performing the same operations as in the production example of toner 3, except that the type of the wax dispersant, and the amount of the crystalline polyester resin in the production example of toner 3 was changed as indicated in Table 3.

In the DSC measurement of the obtained toners 6 to 8, an endothermic peak derived from the crystalline polyester resin was observed.

Production Examples of Toners 9 to 13

Toners 9 to 13 were obtained by performing the same operations as in the production example of toner 3, except that the type of the wax dispersant, and, the type and amount of the crystalline polyester resin in the production example of toner 3 was changed as indicated in Table 3.

In the DSC measurement of the obtained toners 9 to 13, an endothermic peak derived from the crystalline polyester resin was observed.

Production Examples of Toners 14 to 30 and Toner 32

Toners 14 to 30 and toner 32 were obtained by performing the same operations as in the production example of toner 3, except that the crystalline polyester resin was not used and the type of the wax dispersant in the production example of toner 3 was changed as indicated in Table 3.

Production Example of Toner 31

A toner 31 was obtained by performing the same operations as in the production example of toner 3, except that the type and amount of the crystalline polyester resin and the wax dispersant in the production example of toner 3 was changed as indicated in Table 3. In the DSC measurement of the obtained toner 31, an endothermic peak derived from the crystalline polyester resin was observed.

Production Example of Toner 33

A toner 33 was obtained by performing the same operations as in the production example of toner 3, except that the crystalline polyester resin and wax dispersant were not used in the production example of toner 3.

TABLE 3

| Toner | Wax dispersant | Crystalline polyester resin Type | Crystalline polyester resin Number of parts by mass | Production method | Heat treatment step | SP1 - SP2 |
|---|---|---|---|---|---|---|
| 1 | A1 | C1 | 7.5 | Melt kneading method | Included | 1.3 |
| 2 | A1 | C1 | 7.5 | Melt kneading method | None | 1.3 |
| 3 | A1 | C1 | 7.5 | Emulsion aggregation method | None | 1.3 |
| 4 | A2 | C1 | 7.5 | Emulsion aggregation method | None | 1.3 |
| 5 | A3 | C1 | 7.5 | Emulsion aggregation method | None | 1.3 |
| 6 | A3 | C1 | 5.0 | Emulsion aggregation method | None | 1.3 |
| 7 | A3 | C1 | 15.0 | Emulsion aggregation method | None | 1.3 |
| 8 | A3 | C1 | 1.0 | Emulsion aggregation method | None | 1.3 |
| 9 | A3 | C2 | 1.0 | Emulsion aggregation method | None | 1.4 |
| 10 | A3 | C3 | 1.0 | Emulsion aggregation method | None | 1.0 |
| 11 | A3 | C4 | 1.0 | Emulsion aggregation method | None | 1.5 |
| 12 | A3 | C4 | 16.0 | Emulsion aggregation method | None | 1.5 |
| 13 | A3 | C5 | 16.0 | Emulsion aggregation method | None | 2.7 |
| 14 | A3 | None | — | Emulsion aggregation method | None | None |
| 15 | A4 | None | — | Emulsion aggregation method | None | None |
| 16 | A5 | None | — | Emulsion aggregation method | None | None |
| 17 | A6 | None | — | Emulsion aggregation method | None | None |
| 18 | A7 | None | — | Emulsion aggregation method | None | None |
| 19 | A8 | None | — | Emulsion aggregation method | None | None |
| 20 | A9 | None | — | Emulsion aggregation method | None | None |
| 21 | A10 | None | — | Emulsion aggregation method | None | None |
| 22 | A11 | None | — | Emulsion aggregation method | None | None |
| 23 | A12 | None | — | Emulsion aggregation method | None | None |
| 24 | A13 | None | — | Emulsion aggregation method | None | None |
| 25 | A14 | None | — | Emulsion aggregation method | None | None |
| 26 | A15 | None | — | Emulsion aggregation method | None | None |
| 27 | A16 | None | — | Emulsion aggregation method | None | None |
| 28 | A17 | None | — | Emulsion aggregation method | None | None |
| 29 | A18 | None | — | Emulsion aggregation method | None | None |
| 30 | A19 | None | — | Emulsion aggregation method | None | None |
| 31 | A20 | C5 | 7.5 | Emulsion aggregation method | None | 2.3 |
| 32 | A21 | None | — | Emulsion aggregation method | None | None |
| 33 | None | None | — | Emulsion aggregation method | None | None |

Production Example of Magnetic Core Particle 1

Step 1 (Weighing and Mixing Step)

| | |
|---|---|
| Fe$_2$O$_3$ | 62.7 parts |
| MnCO$_3$ | 29.5 parts |
| Mg(OH)$_2$ | 6.8 parts |
| SrCO$_3$ | 1.0 part |

Ferrite starting materials were weighed so as to obtain the above-described composition ratio of the abovementioned materials. Pulverization and mixing were then performed for 5 h in a dry vibration mill using stainless steel beads with a diameter of ⅛ inch.

Step 2 (Pre-Calcination Step)

The obtained pulverized material was processed in a roller compactor into about 1-mm square pellets. Coarse particles was removed from the pellets with a vibration sieve with openings of 3 mm, then fine particles was removed with a vibration sieve with openings of 0.5 mm, and the pellets were calcined for 4 h at a temperature of 1000° C. under a nitrogen atmosphere (oxygen concentration 0.01 vol %) by using a burner calcination furnace to prepare a pre-calcined ferrite. The composition of the pre-calcined ferrite is presented below.

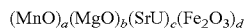

$(MnO)_a(MgO)_b(SrU)_c(Fe_2O_3)_d$

In the formula, a=0.257, b=0.117, c=0.007, and d=0.393.

Step 3 (Pulverization Step)

After pulverization to approximately 0.3 mm with a crusher, 30 parts of water was added to 100 parts of the pre-calcined ferrite, and pulverization was performed for 1 h in a wet ball mill using zirconia beads with a diameter of ⅛ inch. The resulting slurry was pulverized for 4 h in a wet ball mill using alumina beads with a diameter of 1/16 inch to obtain a ferrite slurry (finely pulverized product of the pre-calcined ferrite).

Step 4 (Granulation Step)

A total of 1.0 part of ammonium polycarboxylate as a dispersant and 2.0 parts of polyvinyl alcohol as a binder per 100 parts of the pre-calcined ferrite were added to the ferrite slurry, followed by granulation into spherical particles with a spray dryer (manufactured by Ohkawara Kakohki Co., Ltd.). The obtained particles were adjusted for particle diameter, heated for 2 h at 650° C. by using a rotary kiln, and the organic components of the dispersant and binder were removed.

Step 5 (Calcination Step)

In order to control the calcination atmosphere, the temperature was raised over 2 h from room temperature to a temperature of 1300° C. under a nitrogen atmosphere (oxygen concentration 1.00 vol %) in an electric furnace, and calcination was then performed for 4 h at a temperature of 1150° C. The temperature was then lowered to 60° C. over 4 h, the nitrogen atmosphere was restored to the air, and the product was taken out at a temperature of not more than 40° C.

Step 6 (Selection Step)

The agglomerated particles were crushed, a low-magnetic product was cut by magnetic separation, and coarse particles were removed by sieving with a 250-μm-mesh sieve to obtain magnetic core particles 1 with a 50% particle diameter (D50) of 37.0 μm on a volume distribution basis.

<Preparation of Coating Resin 1>

| | |
|---|---|
| Cyclohexyl methacrylate monomer | 26.8 mass % |
| Methyl methacrylate monomer | 0.2 mass % |
| Methyl methacrylate macromonomer | 8.4 mass % |
| (macromonomer with a weight-average molecular weight of 5000 that has a methacryloyl group at one end) | |
| Toluene | 31.3 mass % |
| Methyl ethyl ketone | 31.3 mass % |
| Azobisisobutyronitrile | 2.0 mass % |

Among the abovementioned materials, cyclohexyl methacrylate monomer, methyl methacrylate monomer, methyl methacrylate macromonomer, toluene, and methyl ethyl ketone were placed in a four-neck separable flask equipped with a reflux cooler, a thermometer, a nitrogen introducing tube, and a stirrer. Nitrogen gas was then introduced to obtain a sufficiently nitrogen atmosphere, and then heating was performed to 80° C. Then, azobisisobutyronitrile was added and polymerization was performed for 5 h under refluxing. Hexane was injected into the obtained reaction product, the copolymer was caused to settle and precipitate, and the precipitate was filtered and vacuum dried to obtain a coating resin 1.

A total of 30 parts of the obtained coating resin 1 was dissolved in 40 parts of toluene and 30 parts of methyl ethyl ketone to obtain a polymer solution 1 (solid fraction: 30 mass %).

<Preparation of Coating Resin Solution 1>

| | |
|---|---|
| Polymer solution 1 (resin solids concentration: 30%) | 33.3 mass % |
| Toluene | 66.4 mass % |
| Carbon black (Regal 330; manufactured by Cabot Corporation) | 0.3 mass % |

(primary particle diameter 25 nm, nitrogen adsorption specific surface area 94 m$^2$/g, DBP oil absorption amount 75 mL/100 g)

The abovementioned materials were dispersed for 1 h in a paint shaker by using zirconia beads with a diameter of 0.5 mm. The resulting dispersion was filtered with a 5.0 μm membrane filter to obtain a coating resin solution 1.

Production Example of Magnetic Carrier 1

Resin Coating Step

The coating resin solution 1 was charged into a kneader of a vacuum degassing type which was maintained at a normal temperature. The amount of charged resin component was 2.5 parts per 100 parts of the magnetic core particles 1. After the charging, stirring was performed for 15 min at a revolution speed of 30 rpm, and after a certain (80 mass %) or larger amount of the solvent was evaporated, the temperature was raised to 80° C., while mixing under reduced pressure, and toluene was distilled off over 2 h, followed by cooling.

A low-magnetic product of the resulting magnetic carrier was fractionated by magnetic separation and passed through a 70-μm-mesh sieve. Subsequent classification with a pneumatic classifier produced a magnetic carrier 1 with a 50% particle diameter (D50) of 38.2 μm on a volume distribution basis.

The toners 1 to 33 were added to the magnetic carrier 1 to obtain the toner concentration of 8.0 mass % and mixed for a revolution time of 5 min at 0.5 s$^{-1}$ by using a V-type mixer (V-10, manufactured by Tokuju Corporation) to obtain two-component developers 1 to 33.

Examples 1 to 30, Comparative Examples 1 to 3

The evaluation was performed using the two-component developers 1 to 33.

A modified Canon printer image RUNNER ADVANCE C9075 PRO for digital commercial printing was used as an image forming apparatus, and the below-described evaluation was performed by placing a two-component developer into a developing unit at a cyan position and adjusting the DC voltage $V_{DC}$ of a developer carrying member, the charging voltage $V_D$ on an electrostatic latent image bearing member, and laser power such as to obtain the desired toner laid-on level on the electrostatic latent image bearing member or paper. The printer was modified to enable free setting of the fixing temperature and process speed.

The evaluation was performed on the basis of the following evaluation method. The results are shown in Table 4.

<Evaluation 1: Charging Performance>

The toner on the electrostatic latent image bearing member was sucked in and collected by using a metal cylindrical tube and a cylindrical filter to calculate the triboelectric charge quantity of the toner and the toner laid-on level.

More specifically, the triboelectric charge quantity of the toner and the toner laid-on level on the electrostatic latent image bearing member were measured with a Faraday cage.

In the Faraday cage, the inner tube and outer tube are electrically insulated due to a coaxial double cylinder configuration. The placement of a charged body with a charge quantity Q into the inner tube is equivalent to the presence of a metal cylinder with a charge quantity Q due to electrostatic induction. The induced charge quantity was measured with an electrometer (Keithley 6517A, manufactured by Keithley Instruments), and the value (Q/M) obtained by dividing the charge quantity Q (mC) by the toner mass M (kg) inside the inner tube was taken as the triboelectric charge quantity of the toner.

Further, the toner laid-on level per unit surface area was obtained by measuring the suction surface area S and dividing the toner mass M by the suction surface area S (cm$^2$).

Before the toner layer formed on the electrostatic latent image bearing member was transferred to the intermediate transfer member, the rotation of the electrostatic latent image bearing member was stopped, and the toner image on the electrostatic latent image bearing member was directly sucked with air to perform the measurements.

Toner laid-on level (mg/cm$^2$)=M/S

Triboelectric charge quantity of the toner (mC/kg)=Q/M

The image forming apparatus was adjusted such that the toner laid-on level on the electrostatic latent image bearing member was 0.35 mg/cm$^2$ in a high-temperature and high-humidity environment (32.5° C., 80% RH), and the toner was sucked and collected by using a metal cylindrical tube and a cylindrical filter. At this time, the charge quantity Q stored in the capacitor through the metal cylindrical tube and the collected toner mass M were measured, and the charge quantity Q/M (mC/kg) per unit mass was calculated and taken as the charge quantity Q/M (mC/kg) per unit mass on the electrostatic latent image bearing member (initial evaluation).

After the above-described evaluation (initial evaluation) was performed, the developing device was removed from the printer, and left to stand for 72 h under a high-temperature and high-humidity environment (32.5° C., 80% RH). The developing device was then again mounted on the printer, and the charge quantity Q/M per unit mass on the electrostatic latent image bearing member was measured at the same DC voltage $V_{DC}$ as in the initial evaluation (post-standing evaluation).

The charge quantity Q/M per unit mass on the electrostatic latent image bearing member in the initial evaluation was taken as 100%, and the retention ratio [(post-standing evaluation)/(initial evaluation)×100] of the charge quantity Q/M per unit mass on the electrostatic latent image bearing member after 72-h standing (post-standing evaluation) was calculated and evaluated according to the following criteria.

(Evaluation Criteria)

A: retention rate of at least 80%
 Very good
B: retention ratio of at least 70% and less than 80%
 Good
C: retention ratio of at least 60% and less than 70%
 Acceptable level in the present invention
D: retention ratio of less than 60%
 Unacceptable Level in the Present Invention <Evaluation 2: Low-Temperature Fixability>

Paper: CS-680 (68.0 g/m$^2$) (available from Canon Marketing Japan Inc.)

Toner laid-on level: 1.20 mg/cm$^2$

Evaluated image: a 10-cm$^2$ image is placed in the center of the A4 paper sheet Fixing test environment: low-temperature and low-humidity environment, 15° C./10% RH (referred to hereinbelow as "L/L")

Process speed: 450 mm/sec

Fixing temperature: 130° C.

The above-described image forming apparatus was used to evaluate the low-temperature fixability of the fixed image output under the abovementioned conditions.

A value of the below-described image density reduction rate was used as an indicator in evaluating the low-temperature fixability.

The image density reduction rate was determined by using an X-Rite color reflection densitometer (500 series, manufactured by X-Rite Inc.), and initially measuring the density of the fixed image in the central portion. Then, a load of 4.9 kPa (50 g/cm$^2$) was applied to the portion where the density of the fixed image was measured, the fixed image was rubbed (5 times back and forth) with lens-cleaning paper, and the density of the fixed image was measured again. The reduction rate (%) in the fixed image density before and after the rubbing was then measured.

(Evaluation Criteria)

A: density reduction rate is less than 1.0%
 (Very good)
B: density reduction rate is at least 1.0% and less than 5.0%
 (Good)
C: density reduction rate is at least 5.0% and less than 10.0%
 (Acceptable level in the present invention)
D: density reduction rate is at least 10.0%
 (Unacceptable in the present invention)

<Evaluation 3: Blocking Resistance (Stability in Storage)>

A total of 5 g of the toner was placed in a 100-mL plastic container, the container was left to stand for 48 h in a thermostat (settings: 55° C., 41% RH) with variable temperature and humidity, and the cohesiveness of the toner after the standing was evaluated.

The evaluation index for the cohesiveness was the remainder ratio of the toner remaining when 20-am mesh sieving is performed for 10 s at a 0.5-mm amplitude in Powder Tester PT-X manufactured by Hosokawa Micron Corporation.

(Evaluation Criteria)
A: remainder ratio is less than 2.0%
  (Very good)
B: remainder ratio is at least 2.0% and less than 10.0%
  (Good)
C: remainder ratio is at least 10.0% and less than 15.0%
  (Acceptable level in the present invention)
D: remainder ratio is at least 15.0%
  (Unacceptable in the present invention)

<Evaluation 4: Hot Offset Resistance>

Paper: CS-680 (68.0 g/m$^2$) (available from Canon Marketing Japan Inc.)
Toner laid-on level: 0.08 mg/cm$^2$
Evaluated image: a 10-cm$^2$ image is placed at two ends of the A4 paper sheet
Fixing test environment: normal-temperature and low-humidity environment, 23° C./5% RH (referred to hereinbelow as "N/L")
Process speed: 450 mm/sec
Fixing temperature: 210° C.

A total of 10 paper-plain postcard sheets were passed through the center of the fixing belt of the fixing device of the image forming apparatus, the fixed images were output under the abovementioned conditions, and the fogging value of the fixed image was taken as the evaluation index of hot offset resistance.

The fogging was calculated by measuring the average reflectance Dr (%) of the evaluation paper before image reproduction and the reflectance Ds (%) of the white background portion after the fixing test with a reflectometer ("REFLECTOMETER MODEL TC-6DS", manufactured by Tokyo Denshoku Co., Ltd.) and using the formula below. The obtained fogging was evaluated according to the following evaluation criteria.

$$\text{Fogging}(\%) = Dr(\%) - Ds(\%)$$

(Evaluation Criteria)
A: less than 0.2%
  (Very good)
B: at least 0.2% and less than 0.5%
  (Good)
C: at least 0.5% and less than 1.0%
  (Acceptable level in the present invention)
D: at least 1.0%
  (Unacceptable in the present invention)

TABLE 4

| Example | Two-component developer | Charging performance Initial Q/M [mC/kg] | Charging performance Post-standing Q/M [mC/kg] | Charging performance Retention ratio [%] | Evaluation | Low-temperature fixability Density reduction ratio [%] | Evaluation | Blocking resistance Remainder ratio [%] | Evaluation | Hot offset resistance Fogging [%] | Evaluation |
|---|---|---|---|---|---|---|---|---|---|---|---|
| Example1 | 1 | 38.6 | 36.8 | 95.4 | A | 0.6 | A | 0.5 | A | 0 | A |
| Example2 | 2 | 36.4 | 34.3 | 94.1 | A | 0.7 | A | 1.0 | A | 0 | A |
| Example3 | 3 | 34.2 | 31.7 | 92.8 | A | 0.8 | A | 1.2 | A | 0.1 | A |
| Example4 | 4 | 33.8 | 31.3 | 92.6 | A | 0.8 | A | 1.2 | A | 0.1 | A |
| Example5 | 5 | 35.0 | 32.8 | 93.7 | A | 0.8 | A | 1.2 | A | 0.2 | B |
| Example6 | 6 | 36.1 | 33.7 | 93.3 | A | 1.2 | B | 0.6 | A | 0.1 | A |
| Example7 | 7 | 35.7 | 32.2 | 90.2 | A | 0.7 | A | 2.1 | B | 0.1 | A |
| Example8 | 8 | 37.9 | 34.7 | 91.6 | A | 3.2 | B | 0.7 | A | 0.2 | B |
| Example9 | 9 | 37.7 | 34.3 | 91.0 | A | 3.5 | B | 0.8 | A | 0.3 | B |
| Example10 | 10 | 37.1 | 33.8 | 91.2 | A | 5.3 | C | 0.8 | A | 0.4 | B |
| Example11 | 11 | 35.1 | 32.1 | 91.5 | A | 2.0 | B | 1.3 | A | 0.3 | B |
| Example12 | 12 | 33.5 | 29.7 | 88.6 | A | 0.9 | A | 2.2 | B | 0.4 | B |
| Example13 | 13 | 33.9 | 29.3 | 86.4 | A | 0.7 | A | 5.1 | B | 0.5 | C |
| Example14 | 14 | 38.1 | 34.5 | 90.6 | A | 5.5 | C | 0.9 | A | 0.6 | C |
| Example15 | 15 | 37.9 | 34.1 | 90.1 | A | 5.7 | C | 1.6 | A | 0.7 | C |
| Example16 | 16 | 36.3 | 30.7 | 84.7 | A | 5.9 | C | 0.9 | A | 0.6 | C |
| Example17 | 17 | 38.0 | 34.4 | 90.6 | A | 6.3 | C | 1.8 | A | 0.9 | C |
| Example18 | 18 | 35.9 | 28.2 | 78.6 | B | 6.2 | C | 2.5 | B | 0.6 | C |
| Example19 | 19 | 35.6 | 27.4 | 77.1 | B | 7.0 | C | 2.7 | B | 0.7 | C |
| Example20 | 20 | 35.8 | 27.3 | 76.3 | B | 7.5 | C | 2.8 | B | 0.7 | C |
| Example21 | 21 | 35.8 | 27.0 | 75.4 | B | 7.8 | C | 3.0 | B | 0.7 | C |
| Example22 | 22 | 35.2 | 26.6 | 75.5 | B | 8.0 | C | 3.3 | B | 0.8 | C |
| Example23 | 23 | 35.4 | 26.6 | 75.2 | B | 8.4 | C | 3.5 | B | 0.8 | C |
| Example24 | 24 | 35.6 | 26.9 | 75.6 | B | 8.7 | C | 3.4 | B | 0.8 | C |
| Example25 | 25 | 35.1 | 26.4 | 75.1 | B | 9.0 | C | 3.6 | B | 0.8 | C |
| Example26 | 26 | 34.9 | 25.7 | 73.5 | B | 9.2 | C | 4.1 | B | 0.8 | C |
| Example27 | 27 | 34.5 | 25.2 | 72.9 | B | 9.4 | C | 4.4 | B | 0.8 | C |
| Example28 | 28 | 33.3 | 23.1 | 69.4 | C | 9.6 | C | 4.6 | B | 0.8 | C |
| Example29 | 29 | 33.1 | 22.5 | 68.1 | C | 9.7 | C | 5.6 | B | 0.8 | C |
| Example30 | 30 | 32.4 | 21.0 | 64.8 | C | 9.8 | C | 7.7 | B | 0.8 | C |

TABLE 4-continued

| Example | Two-component developer | Charging performance Initial Q/M [mC/kg] | Charging performance Post-standing Q/M [mC/kg] | Charging performance Retention ratio [%] | Eval-uation | Low-temperature fixability Density reduction ratio [%] | Eval-uation | Blocking resistance Remainder ratio [%] | Eval-uation | Hot offset resistance Fogging [%] | Eval-uation |
|---|---|---|---|---|---|---|---|---|---|---|---|
| Comparative Example1 | 31 | 31.5 | 17.5 | 55.4 | D | 9.2 | C | 17.9 | D | 0.6 | C |
| Comparative Example2 | 32 | 31.2 | 16.2 | 51.9 | D | 12.6 | D | 18.4 | D | 0.9 | C |
| Comparative Example3 | 33 | 30.7 | 15.5 | 50.4 | D | 15.2 | D | 20.5 | D | 1.5 | D |

In Example 1, the charging performance, low-temperature fixability, blocking resistance, and hot offset resistance were all good.

In Example 2, since the toner particle was not heat treated, the wax and wax dispersant did not migrate to the toner particle surface and the blocking resistance somewhat decreased as compared with Example 1.

In Example 3, since the production method of the toner particle was the emulsion aggregation method, the dispersibility of the wax slightly decreased and the hot offset resistance decreased.

In Example 4, since the acid value of the wax dispersant was increased from 30 (mg KOH/g) to 60 (mg KOH/g), the hydrophobicity decreased as compared with Example 3, and the charging performance slightly decreased.

In Example 5, since the acid value of the wax dispersant was made 0, the dispersibility of the wax decreased, and the hot offset resistance slightly decreased as compared with Example 3.

In Example 6, since the amount added of the crystalline polyester resin was reduced to 5.0 parts by mass, the plasticizing effect of the crystalline polyester resin was reduced and the toner particle became hard. As a result, the low-temperature fixability decreased and the blocking resistance increased as compared with Example 5.

In Example 7, since the amount added of the crystalline polyester resin was increased to 15.0 parts by mass, the plasticizing effect of the crystalline polyester resin was enhanced and the toner particle became soft. As a result, the low-temperature fixability increased and the blocking resistance decreased as compared with Example 5.

In Example 8, since the amount added of the crystalline polyester resin was reduced to 1.0 parts by mass, the plasticizing effect of the crystalline polyester resin was reduced, the low-temperature fixing property decreased as compared with Example 5, and the blocking resistance increased.

In Example 9, the type of the crystalline polyester resin was changed from a diol with a carbon number of 6 and a dicarboxylic acid with a carbon number of 12 to a diol with a carbon number of 12 and a dicarboxylic acid with a carbon number of 6, but the plasticizing effect of the crystalline polyester resin did not change. However, the value of SP2-SP1 became 1.4, the difference in solubility parameter increased, the affinity of the crystalline polyester resin and the wax dispersant did not improve, and the dispersion of the wax in the toner particle somewhat deteriorated as compared with Example 8. As a result, the hot offset resistance decreased.

In Example 10, the type of the crystalline polyester resin was changed to a diol with a carbon number of 10 and a dicarboxylic acid with a carbon number of 10. As a result, the plasticizing effect of the crystalline polyester resin was slightly reduced and the low-temperature fixability decreased.

In Example 11, the type of the crystalline polyester resin was changed to a diol with a carbon number of 6 and a dicarboxylic acid with a carbon number of 10. As a result, the plasticizing effect of the crystalline polyester resin was enhanced and the low-temperature fixability increased. Further, the value of SP2-SP1 became 1.5, the difference in solubility parameter increased, the affinity of the crystalline polyester resin and the wax dispersant did not improve, and the dispersion of the wax in the toner particle somewhat deteriorated as compared with Example 8. As a result, the hot offset resistance decreased In Example 12, the type of the crystalline polyester resin was changed to a diol with a carbon number of 6 and a dicarboxylic acid with a carbon number of 10 and the amount added thereof was increased to 16.0 parts by mass. As a result, the plasticizing effect of the crystalline polyester resin was enhanced, the toner particle became soft, and the low-temperature fixability, increased. However, the blocking resistance and hot offset resistance decreased.

In Example 13, the type of the crystalline polyester resin was changed to a diol with a carbon number of 6 and a dicarboxylic acid with a carbon number of 4 and the amount added thereof was increased to 16.0 parts by mass. As a result, the plasticizing effect of the crystalline polyester resin was enhanced, the toner particle became soft, and the low-temperature fixability increased. However, the blocking resistance and hot offset resistance decreased.

In Example 14, the crystalline polyester resin was not added. As a result, the blocking resistance increased, but the low-temperature fixability decreased.

In Example 15, the weight-average molecular weight of the wax dispersant was made 70,000. For this reason, the wax dispersant was unlikely to move in the toner particle. As a result, the dispersibility of the wax decreased, and the hot offset resistance decreased as compared with Example 14.

In Example 16, the weight-average molecular weight of the wax dispersant was made 5000. For this reason, the wax dispersant could easily move in the toner particle, seeping of the wax to the surface of the toner particle slightly increased as compared with Example 14, and the charging performance slightly decreased.

In Example 17, the weight-average molecular weight of the wax dispersant was made 80,000. For this reason, the wax dispersed in the toner particle was unlikely to migrate rapidly to the toner particle surface during fixing and melting, and the hot offset resistance decreased.

In Example 18, the weight-average molecular weight of the wax dispersant was made 4000. For this reason, the wax dispersant could easily move in the toner particle, seeping of the wax to the surface of the toner particle increased as compared with Example 14, and the blocking resistance and charging performance decreased.

In Examples 19, 20 and 21, the hydrocarbon compound was changed to a Fischer-Tropsch wax with a melting point of 105° C., a Fischer-Tropsch wax with a melting point of 90° C., and a paraffin wax with a melting point of 77° C., respectively. As a result, the dispersibility of the wax decreased and hot offset resistance also decreased as compared with Example 18 in which polypropylene with a melting point of 90° C. was used.

In Examples 22, 23, 24, and 25, the composition of the styrene-acrylic resin was changed to isobutyl acrylate, 2-ethylhexyl acrylate, ethyl acrylate, and methyl acrylate, respectively. As a result, the decrease in the glass transition temperature (Tg) of the toner particle was reduced, and the low-temperature fixability decreased.

In Examples 26, 27, 28, 29, and 30, the saturated alicyclic compound was changed to cycloheptyl methacrylate, cyclooctyl methacrylate, cyclopentyl methacrylate, cyclobutyl methacrylate, and cyclopropyl methacrylate, respectively. As a result, in Examples 26 and 27, the hydrophobicity of the toner particle decreased and therefore the charging performance decreased. Further, in Examples 28 and 29, the hydrophobicity of the toner particle further decreased and the charging performance decreased. In Example 30, the hydrophobicity further decreased and the charging performance decreased. Furthermore, in Examples 29 and 30, the cyclic structure of the saturated alicyclic compound was small. As a result, the wax dispersant and wax could easily move, seeping of the wax to the toner particle surface increased, and the blocking resistance decreased.

In Comparative Example 1, a toner particle was produced so that the toner particle included the crystalline polyester resin, but the wax dispersant did not include the saturated alicyclic compound. As a result, although the low-temperature fixability was improved by the plasticizing effect of the crystalline polyester resin, the charging performance and blocking resistance were at levels unacceptable in the present invention.

In Comparative Example 2, a toner particle was produced in which the wax dispersant did not include the saturated alicyclic compound. As a result, the charging performance, blocking resistance, and low-temperature fixability were at levels unacceptable in the present invention.

In Comparative Example 3, the wax dispersant was not used. As a result, the wax was not dispersed and the charging performance, low-temperature fixability, blocking resistance, and hot offset resistance were at levels unacceptable in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-166044, filed Aug. 25, 2015, Japanese Patent Application No. 2016-156374, filed Aug. 9, 2016, which are hereby incorporated by reference herein in their entirety.

What is claimed is:

1. A wax dispersant for a toner comprising:
   a graft polymer having a polypropylene onto which a styrene-acrylic resin is grafted, wherein
   the styrene-acrylic resin has a monomer unit represented by Formula (1)

where $R_1$ represents a methyl group, and $R_2$ represents a cyclohexyl group, a cycloheptyl group, a cyclooctyl group, a cyclopentyl group, a cyclobutyl group, or a cyclopropyl group.

2. The wax dispersant for a toner according to claim 1, wherein the styrene-acrylic resin further contains a monomer unit represented by Formula (2)

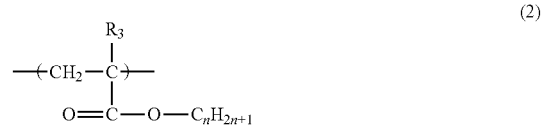

where $R_3$ represents a hydrogen atom, and $C_nH_{2n+1}$ represents a butyl group, an iso-butyl group, a 2-ethylhexyl group, an ethyl group, or a methyl group.

3. The wax dispersant for a toner according to claim 1, wherein in a molecular weight distribution determined by gel permeation chromatography of the wax dispersant for a toner, a weight-average molecular weight is 5000 to 70,000.

4. A toner comprising:
   a toner particle that contains a binder resin, a wax, and a graft polymer having a polypropylene onto which a styrene-acrylic resin is grafted, wherein
   the styrene-acrylic resin has a monomer unit represented by Formula (1)

where $R_1$ represents a methyl group, and $R_2$ represents a cyclohexyl group, a cycloheptyl group, a cyclooctyl group, a cyclopentyl group, a cyclobutyl group, or a cyclopropyl group.

5. The toner according to claim 4, wherein the styrene-acrylic resin further contains a monomer unit represented by Formula (2)

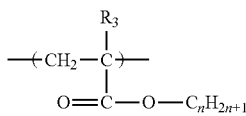

(2)

where $R_3$ represents a hydrogen atom, and $C_nH_{2n+1}$ represents a butyl group, an iso-butyl group, a 2-ethylhexyl group, an ethyl group, or a methyl group.

6. The toner according to claim 4, wherein in a molecular weight distribution determined by gel permeation chromatography of the graft polymer, a weight-average molecular weight is 5000 to 70,000.

7. The toner according to claim 4, wherein the binder resin comprises a crystalline polyester resin and an amorphous polyester resin.

8. The toner according to claim 7, wherein
the crystalline polyester resin is a polycondensate of an alcohol component comprising at least one compound selected from the group consisting of an aliphatic diol having a carbon number of 6 to 12 and a derivative thereof, and a carboxylic acid component comprising at least one compound selected from the group consisting of an aliphatic dicarboxylic acid having a carbon number of 6 to 12 and a derivative thereof, and
an amount of the crystalline polyester resin is 1.0 to 15.0 parts by mass per 100.0 parts by mass of the amorphous polyester resin.

9. The toner according to claim 7, wherein a solubility parameter SP1 of the crystalline polyester resin and a solubility parameter SP2 of the graft polymer satisfy $0 \leq SP1-SP2 \leq 1.3$.

10. The toner according to claim 4, wherein an acid value of the graft polymer is 5 to 50 mg KOH/g.

11. The toner according to claim 7, wherein the amount of the crystalline polyester resin in the toner particle is 2.0 to 10.0 parts by mass per 100.0 parts by mass of the amorphous polyester resin.

12. A two-component developer comprising:
a toner and a magnetic carrier, the toner comprising a toner particle that contains a binder resin, a wax, and a graft polymer having a polypropylene onto which a styrene-acrylic resin is grafted, wherein
the styrene-acrylic resin has a monomer unit represented by Formula (1):

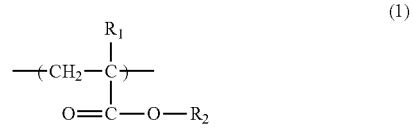

(1)

where $R_1$ represents a methyl group, and $R_2$ represents a cyclohexyl group, a cycloheptyl group, a cyclooctyl group, a cyclopentyl group, a cyclobutyl group, or a cyclopropyl group.

13. The wax dispersant for a toner according to claim 1, wherein the styrene-acrylic resin is a copolymer of a cyclohexyl methacrylate, a butyl acrylate, a styrene, and a methacrylic acid.

14. The toner according to claim 4, wherein the styrene-acrylic resin is a copolymer of a cyclohexyl methacrylate, a butyl acrylate, a styrene, and a methacrylic acid.

15. The two-component developer according to claim 12, wherein the styrene-acrylic resin is a copolymer of a cyclohexyl methacrylate, a butyl acrylate, a styrene, and a methacrylic acid.

* * * * *